(12) United States Patent
Sasaki

(10) Patent No.: US 8,926,244 B2
(45) Date of Patent: Jan. 6, 2015

(54) MEMBER FASTENING STRUCTURE AND CLIP FOR FASTENING MEMBER

(75) Inventor: Yuji Sasaki, Toyota (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 129 days.

(21) Appl. No.: 13/642,982

(22) PCT Filed: Apr. 20, 2011

(86) PCT No.: PCT/JP2011/059734
§ 371 (c)(1),
(2), (4) Date: Dec. 20, 2012

(87) PCT Pub. No.: WO2011/136105
PCT Pub. Date: Nov. 3, 2011

(65) Prior Publication Data
US 2013/0091669 A1    Apr. 18, 2013

(30) Foreign Application Priority Data
Apr. 27, 2010  (JP) .................................. 2010-102506

(51) Int. Cl.
*F16B 13/06*       (2006.01)

(52) U.S. Cl.
USPC ............................................. 411/45; 49/49

(58) Field of Classification Search
USPC ....................................... 411/45, 46, 49, 508
IPC .................................................... F16B 19/1081
See application file for complete search history.

(56) References Cited

U.S. PATENT DOCUMENTS

| 4,674,930 | A | * | 6/1987 | Poe et al. | 411/40 |
| 5,211,519 | A | * | 5/1993 | Saito | 411/45 |
| 5,641,255 | A | * | 6/1997 | Tanaka | 411/48 |
| 5,718,549 | A | * | 2/1998 | Noda et al. | 411/553 |
| 6,182,482 | B1 | * | 2/2001 | Issitt | 70/160 |
| 7,553,116 | B2 | * | 6/2009 | Lesecq | 411/45 |

FOREIGN PATENT DOCUMENTS

| JP | H01-165810 U | 11/1989 |
| JP | 2512362 Y2 | 10/1996 |
| JP | 2002-339930 A | 11/2002 |
| JP | 2009-41673 A | 2/2009 |
| JP | 2010-7687 A | 1/2010 |

OTHER PUBLICATIONS

Korea Patent Office, "Office Action for KR 10-2012-7026622," Oct. 25, 2013.
PCT, "International Search Report for PCT/JP2011/059734" Aug. 2, 2011.

* cited by examiner

*Primary Examiner* — Gary Estremsky
(74) *Attorney, Agent, or Firm* — Manabu Kanesaka

(57) ABSTRACT

A member fastening structure has an installation member (for example, grommet) and a leg member (for example, pin). A projecting part, having at least one inclined surface, and a projecting wall, for contacting with the inclined surface of the projecting part and guiding in a direction of removing the leg member (for example, pin) from the installation member (for example, grommet) in a case when the leg member (for example, pin) is rotated in a state where elastic leg pieces are spread open, are provided between the installation member (for example, grommet) and the leg member (for example, pin).

7 Claims, 32 Drawing Sheets

MEMBER FASTENING STRUCTURE AND CLIP FOR FASTENING MEMBER

TECHNOLOGICAL FIELD

The present invention relates to a member fastening structure and a clip for fastening a member, wherein a projecting part having at least one inclined surface and a projecting wall for contacting with the inclined surface of the projecting part are provided between an installation member and a leg member, whereby the structure of at least the projecting wall can be made simple and convenient.

BACKGROUND TECHNOLOGY

There is previously known a fastener, in which cam parts to contact with each other are provided respectively on a female fastener and a male fastener (see: Patent Document 1, page 4, left column, lines 4 to 8; same page, left column, last line to same page, right column line 3; and FIG. 1).

The cam part of the above female fastener of the past is provided rising in an inclined form (see: Patent Document 1, page 4, left column, lines 7 to 8; and FIG. 1).

PRIOR ART DOCUMENTS

Patent Documents

Patent Document 1: U.S. Pat. No. 2,512,362

Problems To Be Solved By The Invention

However, because the cam part of the above female fastener of the past is provided rising in an inclined form in a circumferential direction of an annular recessed step part, the structure becomes asymmetrical with respect to front to back in the circumferential direction, and there is a problem that production of the female fastener is difficult.

That is, for example, in the case when the female fastener of the past is injection-molded using a mold, the structure of the mold is made complex, and therefore the work factor of mold-drawing and the work factor of design are increased as a result. Also, with the female fastener of the past, because the structure of the mold is complex, there is a drawback that it is difficult for the designer to notice poor conditions in the mold and in molding, and there is a high probability that the same kinds of poor conditions will arise.

Particularly in the case of a product that is symmetrical on the left and right of a vehicle, such as a bumper retainer, the cam part of the above female fastener of the past must be drawn asymmetrically left to right, the work factor of drawing is increased, and design errors and mold production errors are brought about.

Therefore, the present invention was created in consideration of the problems of the abovementioned prior art, and an object thereof is to be able to simplify the structure of at least the projecting wall.

Means For Solving The Problems

The present invention was created in order to achieve the abovementioned object, and the member fastening structure according to the present invention firstly is configured with the following.
(1) Installation member (for example, grommet)
(2) Leg member (for example, pin)

The installation member (for example, grommet) is provided with the following configuration.
(3) Collar-form part
The collar-form part has a through-hole in the thickness direction.
(4) Elastic leg piece
The elastic leg pieces are placed in a series in a cylindrical form on another side than that of the collar-form part to form a cylindrical part connecting through to the through-hole of the collar-form part, and have raised parts facing inner faces.

The above leg member (for example, pin) is provided with the following configuration.
(5) Flange
(6) Wide-diameter part and narrow-diameter part
The wide-diameter part and the narrow-diameter part are integrally placed projecting from the flange and are provided continuing at least toward a leading-end side.

Secondly, a cam part is placed rising in a circumferential direction of the wide-diameter part from the narrow-diameter part of the leg member (for example, pin).

Thirdly, the member fastening structure is such that the raised parts of the elastic leg pieces ride up on the cam part by insertion of the leg member (for example, pin) into the installation member (for example, grommet) so that the elastic leg pieces are spread open.

Fourthly, the following configuration is provided between the installation member (for example, grommet) and the leg member (for example, pin).
(7) Projecting part
The projecting wall has at least one inclined surface.
(8) Projecting wall
The projecting wall is for contacting with the inclined surface of the projecting part and guiding in a direction of removing the leg member (for example, pin) from the installation member (for example, grommet) in a case when the leg member (for example, pin) is rotated in a state in which the elastic leg pieces are spread open.

The member fastening structure according to the present invention may be characterized by the following points.

Firstly, the projecting wall is provided on the installation member (for example, grommet).

Secondly, the projecting wall is formed in a symmetrical form with respect to front to back in a circumferential direction centered on the through-hole.

In this case, by providing the projecting wall on the installation member, the structure of the installation member, as well as the production, can be made simple and convenient. In addition to this, by forming the projecting wall provided on the installation member in a symmetrical form with respect to front to back centered on the through-hole, the structure of the installation member, as well as the production, can be made one level more simple and convenient.

The member fastening structure according to the present invention may be characterized by the following points.

Firstly, the projecting part is formed on a lower side of the flange of the leg member (for example, pin).

Secondly, the projecting wall is formed on the collar-form part of the installation member (for example, grommet).

In this case, by forming the projecting part on the lower side of the flange of the leg member, the projecting wall can be formed on the collar-form part of the installation member.

The member fastening structure according to the present invention may be characterized by the following points.

Firstly, the projecting part (for example, lock-releasing part) is formed between the wide-diameter part and the narrow-diameter part of the leg member (for example, pin).

Secondly, the projecting wall (for example, second raised part) is formed on the elastic leg piece (for example, second elastic leg piece) of the installation member (for example, grommet).

In this case, by forming the projecting part between the wide-diameter part and the narrow-diameter part of the leg member, the projecting wall can be formed on the elastic leg piece of the installation member.

Also, the first clip according to the present invention firstly has the following configuration.

(1) Grommet
(2) Pin

The above grommet has the following configuration.

(3) Collar-form part
(4) Leg part

The leg part is provided hanging down from the collar-form part.

(5) Through-hole

The through-hole runs through the leg part from the collar-form part.

The above pin has the following configuration.

(6) Shaft part

The shaft part is capable of increasing the leg part in diameter by being inserted into the through-hole.

(7) Flange

The flange extends from the shaft part and has a larger diameter than the through-hole.

Secondly, a recessed part and a raised part (for example, second raised part), for preventing movement in an axial direction of the shaft part in the through-hole by fitting together elastically in a state in which the leg part is made capable of being increased in diameter, are provided, either one on either part, between the leg part and the shaft part.

Thirdly, a lock-releasing part, for being elastically contacted by the raised part (for example, second raised part) having come out from the recessed part and for allowing movement in the axial direction of the shaft part in the through-hole in a case when the flange is rotated in a state in which the recessed part and the raised part (for example, second raised part) are fitted together, is provided in a circumferential direction of the recessed part.

Fourthly, an inclined surface, for urging in a direction that the shaft part comes out from the through-hole using an elastic return force of the raised part (for example, second raised part) elastically contacting with the lock-releasing part, is provided on the lock-releasing part.

Furthermore, the second clip according to the present invention firstly has the following configuration.

(1) Grommet
(2) Pin

The above grommet has the following configuration.

(3) Collar-form part
(4) Leg part

The leg part is provided hanging down from the collar-form part.

(5) Through-hole

The through-hole runs through the leg part from the collar-form part.

The above pin has the following configuration.

(6) Shaft part

The shaft part is capable of increasing the leg part in diameter by being inserted into the through-hole.

(7) Flange

The flange extends from the shaft part and has a larger diameter than the through-hole.

Secondly, a recessed part and a raised part (for example, second raised part), for preventing movement in an axial direction of the shaft part in the through-hole by fitting together elastically in a state in which the leg part is made capable of being increased in diameter, are provided, either one on either part, between the leg part and the shaft part.

Thirdly, a lock-releasing part, for being elastically contacted by the raised part (for example, second raised part) having come out from the recessed part and for allowing movement in the axial direction of the shaft part in the through-hole in a case when the flange is rotated in a state in which the recessed part and the raised part (for example, second raised part) are fitted together, is provided in a circumferential direction of the recessed part.

Fourthly, an elastic body endowed with elasticity is provided on a perimeter edge of the flange.

Fifthly, a wall part, for elastically contacting with the elastic body in a state in which the leg part is made capable of being increased in diameter, is provided on the collar-form part.

Sixthly, urging is carried out in a direction that the shaft part comes out from the through-hole by an elastic return force having been accumulated in the elastic body in a case when the flange is rotated in the state in which the leg part is made capable of being enlarged in diameter.

Effects of the Invention

According to the member fastening structure according to the present invention, effects such as the following are exhibited.

By providing a projecting part having at least one inclined surface and a projecting wall for contacting with the inclined surface of the projecting part between the installation member and the leg member, the structure of at least the projecting wall can be made simple and convenient.

The first clip for fastening a member according to the present invention can provide an optimal clip for the member fastening structure according to the present invention. In addition to this, in the case when the flange is rotated in a state in which the pin is locked to the grommet, urging can be carried out in the direction of removing the shaft part of the pin from the through-hole of the grommet using the elastic return force of the projecting part elastically contacting with the inclined surface of the lock-releasing part.

The second clip for fastening a member according to the present invention also can provide an optimal clip for the member fastening structure according to the present invention. In addition to this, in the case when the flange is rotated in a state in which the pin is locked to the grommet, urging can be carried out in the direction of removing the shaft part of the pin from the through-hole of the grommet by the elastic return force accumulated in the elastic body of the flange.

EMBODIMENTS OF THE INVENTION (First Embodiment)

(Member Fastening Structure 10)

Figure 1:
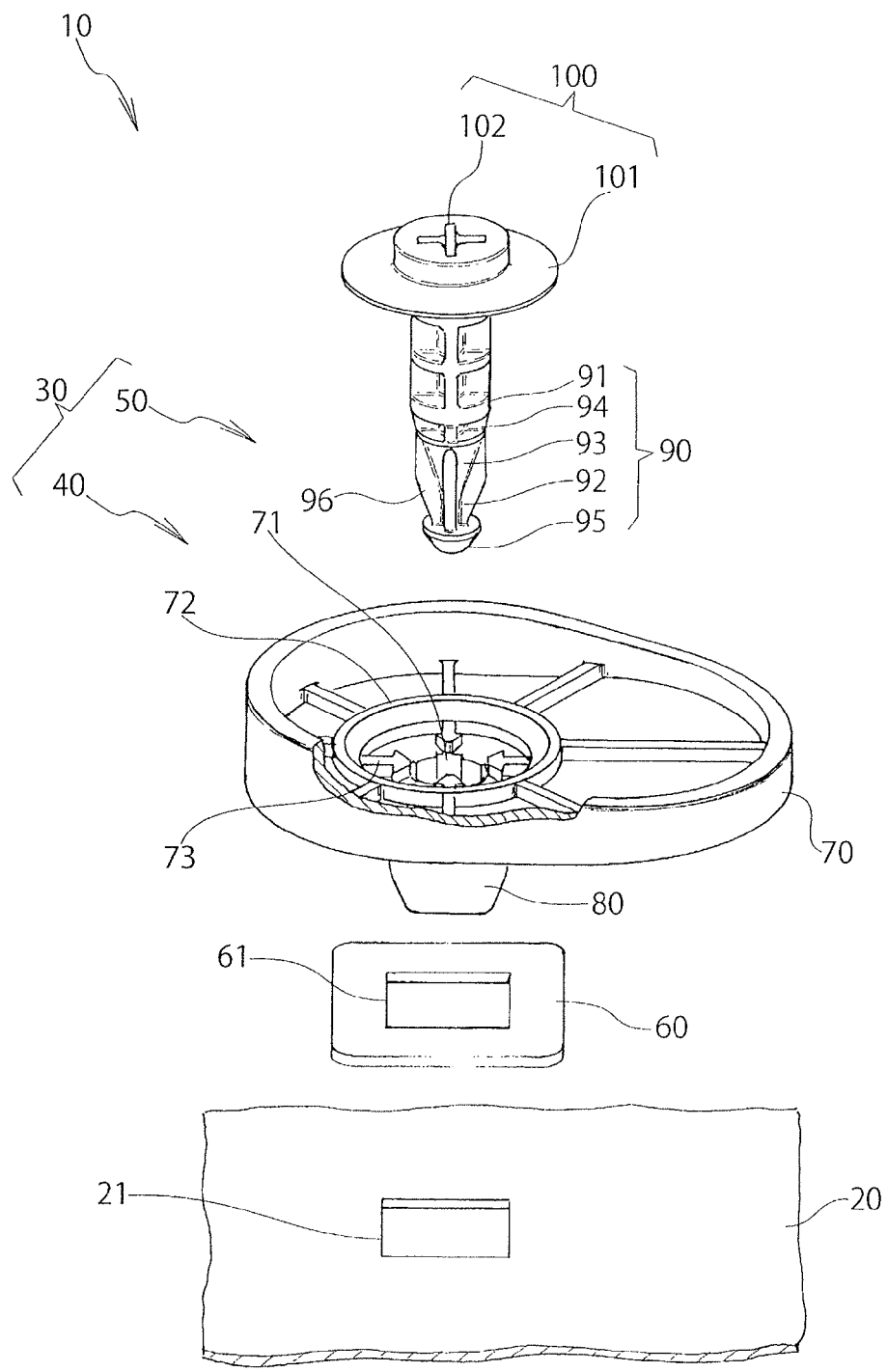
FIG. 1 is an exploded perspective view of the member fastening structure according to a first embodiment of the present invention.

In FIG. 1, numeral 10 indicates a member fastening structure, and the member fastening structure 10 is for fastening a bumper (not illustrated), being one example of a part, to a base 20, for example being an automobile body, although not illustrated, by way of a clip 30 configuring a portion of a bumper retainer (not illustrated).

An installation hole 21 for installing the clip 30 is provided on the base 20 as illustrated in FIG. 1. The installation hole 21 runs through the base 20 top to bottom, and is formed in a noncircular, for example square shape.

The installation hole 21 is formed in a square shape, but the present invention is not limited to this, and the installation hole 21 may be in a noncircular shape in which the clip 30 does not rotate.

Meanwhile, an automobile body is illustrated as an example of the base 20, but the present invention is not limited to this, and is not limited to use for automobiles, and may be used for other vehicles, or buildings, furniture, office equipment, or the like.

Also, a bumper is illustrated as an example of the part, but the present invention is not limited to this. Also, the bumper retainer (not illustrated) and the clip 30 are considered as a portion of the part, but this point is to be discussed as "modes of parts."

Furthermore, the clip 30 is configured as a portion of the bumper retainer, but the present invention is not limited to this, and the clip 30 may be configured separately from the bumper retainer.

(Clip 30)

Figure 2:
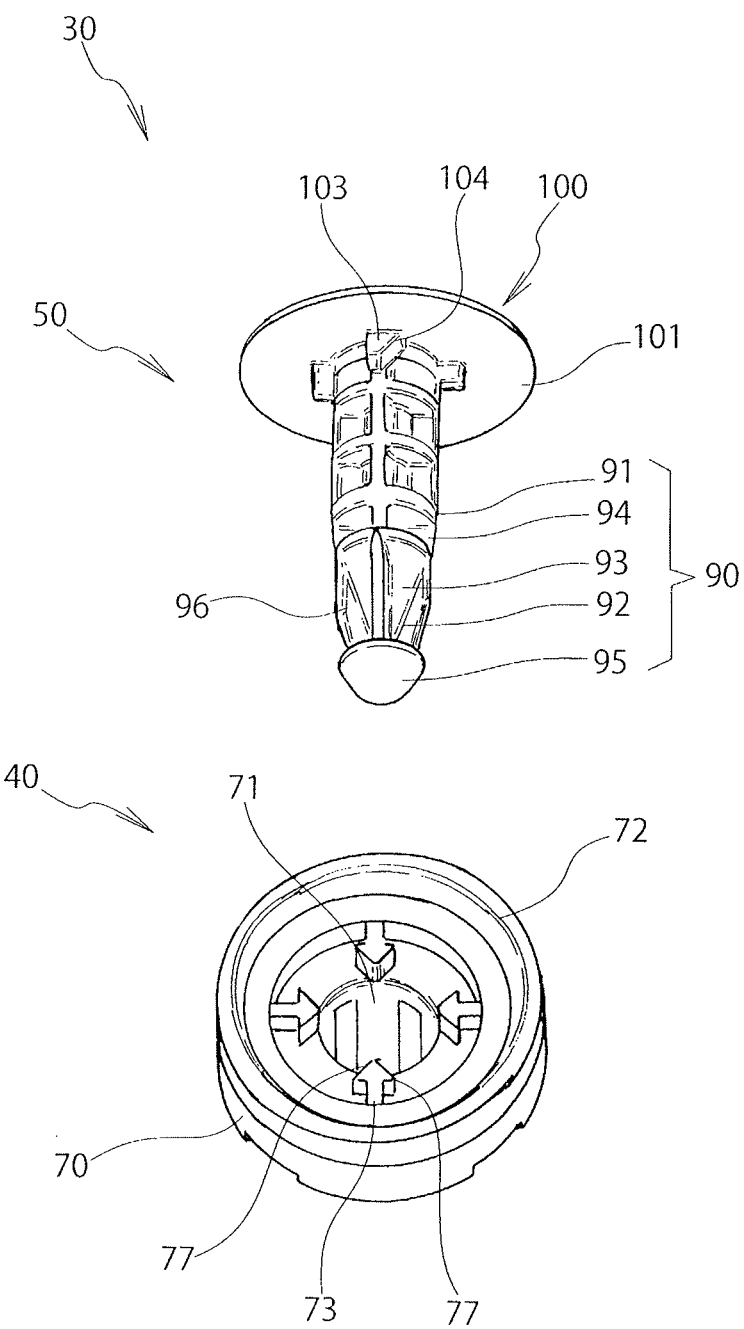
FIG. 2 is a exploded perspective view of the clip.

The clip 30, broadly divided, has the following configuration, as illustrated in FIGS. 1 and 2.

The following (1) to (3) are to be described.

(1) Grommet 40 (installation member)

(2) Pin 50 (leg member)

(3) Packing 60

The configuration of the clip 30 is not limited to the above (1) to (3).

(Grommet 40)

The grommet 40 configures a portion of the bumper retainer (not illustrated), is bound to the base 20 by being installed in the installation hole 21 of the base 20 and inserting a pin 50 to be described, as illustrated in FIGS. 1 to 4, and constitutes the installation member. The bumper retainer is bound to the base 20 by way of the grommet 40. The grommet 40 is integrally molded with a synthetic resin having a suitable degree of elasticity and rigidity.

The grommet 40 is configured as a portion of the bumper retainer, but the present invention is not limited to this, and the grommet may be configured separately from the bumper retainer. Also, the grommet 40 is illustrated as an example of the installation member, but the present invention is not limited to this.

Specifically, the grommet 40 has the following parts, as illustrated in FIGS. 7 to 14.

The following (1) and (2) are to be described.

(1) Collar-form part 70

(2) Leg part 80

The parts of the grommet 40 are not limited to the above (1) and (2).

(Pin 50)

The pin 50 is for fastening the grommet 40 to the base 20 by being inserted in to the grommet 40, as illustrated in FIGS. 1 to 4, and constitutes the leg member. The pin 50 is integrally molded with a synthetic resin having a suitable degree of elasticity and rigidity.

A pin is illustrated as the leg member, but the leg member is not limited to this.

Specifically, the pin 50 has the following parts, as illustrated in FIGS. 15 to 21.

The following (1) and (2) are to be described.

(1) Shaft part 90

(2) Flange 100

The parts of the grommet 40 pin 50 are not limited to the above (1) and (2).

(Packing 60)

The packing 60 is positioned between the base 20 and the grommet 40 as illustrated in FIG. 1, and is for preventing intrusion of water from the installation hole 21 of the base 20. The packing 60 is formed with a material endowed with elasticity, and for example, is formed in a square plate form. A square center hole 61, conforming to the external shape of the leg part 80 of the grommet 40 to be described, is formed in the center of the packing 60, running through from top to bottom.

(Collar-Form Part 70)

The collar-form part 70 configures a portion of the bumper retainer (not illustrated), and contacts with the base 20, as illustrated in FIGS. 1 to 4.

Specifically, the collar-form part 70 is formed in an oblong disk shape in planar section, and the outer diameter is set larger than the inner diameter of the installation hole 21 of the base 20.

The collar-form part 70 is configured as a portion of the bumper retainer, but the present invention is not limited to this, and the collar-form part 70 may be formed separately from the bumper retainer. Also, the collar-form part 70 is placed directly in contact with the base, but the present invention is not limited to this, and the collar-form part 70 may be placed indirectly in contact with the base 20 by way of the bumper retainer in the case when being configured separately from the bumper retainer.

The collar-form part 70 has the following parts, as illustrated in FIGS. 7 to 14.

The following (1) to (3) are to be described.
(1) Through-hole 71
(2) Wall part 72
(3) Projecting wall 73

The parts of the collar-form part 70 are not limited to the above (1) to (3).

(Through-Hole 71)

The through-hole 71 is for the shaft part 90 of the pin 50 to be inserted through, as illustrated in FIGS. 1 to 4.

Specifically, the through-hole 71 is formed in a circular shape in the center of the collar-form part 70, and runs through from top to bottom, that is, in the vertical direction in FIG. 1.

(Wall Part 72)

The wall part 72 extends toward the direction of insertion of the pin 50, as illustrated in FIGS. 1 to 4.

Specifically, the wall part 72 is centered on the through-hole 71, is shaped in an annular rib form being one size larger, and projects from an upper face of the collar-form part 70. The wall part 72 is formed in a trapezoidal shape in section with an inclined surface 74 being oriented toward the center of the through-hole 71. The inclined surface 74 is positioned on an inner wall, more specifically an inner side face, of the wall part 72, and is inclined downward toward the direction of the through-hole 71. Also, a top face 75, being an upper face of the wall part 72, is formed in parallel with an upper face of the wall part 72, and a connecting part 76 is formed on a corner part between the top face 75 and the inclined surface 74.

(Projecting Wall 73)

Figure 22:
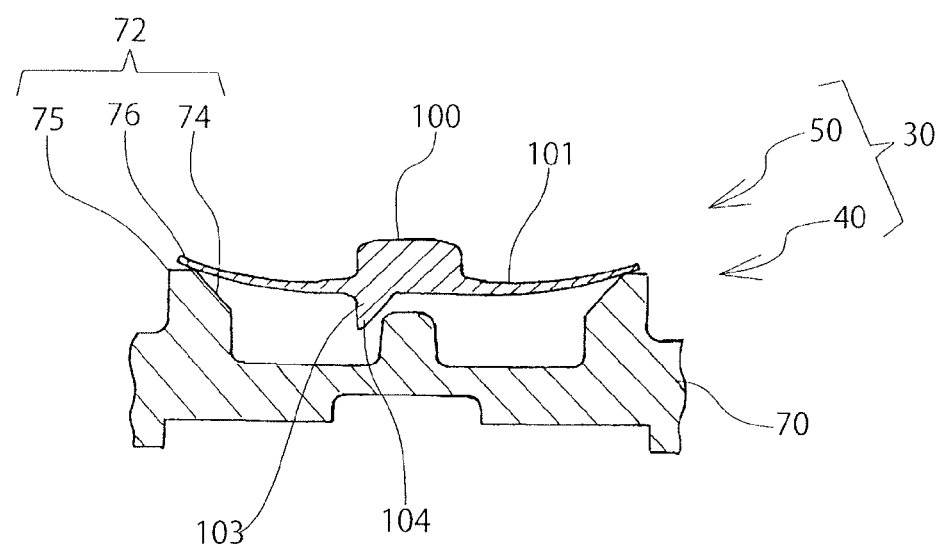
FIG. 22 is a diagram for describing the coupled state between the projecting wall of the grommet and the projecting part of the pin.

The projecting wall 73 is positioned between the through-hole 71 and the wall part 72 as illustrated in FIGS. 2 and 22, and contacts with a projecting part 103 formed on a lower side of the flange 100 of the pin when the pin 50 to be described is rotated, to guide in the direction that the shaft part 90 of the pin 50 comes out from the through-hole 71.

Specifically, four projecting walls 73 are formed radially centered on the through-hole 71, projecting from the upper face of the collar-form part 70 and being formed in symmetrical shapes with respect to front to back in the circumferential direction of the collar-form part 70. Each projecting wall 73 is formed in an "arrowhead" or "arrow mark" shape in planar section, and a triangularly shaped pointed tip of the tip part of the "arrowhead" or "arrow mark" is oriented toward the through-hole 71. Inclined surfaces 77 and 77, being positioned on the front and back in the circumferential direction and being inclined in a tapered form, are formed on both sides of the triangular tip part of the projecting wall 73.

The projecting wall 73 contacts with the projecting part 103 projecting from a lower face of the flange 100 of the pin 50 to be described. That is, when the shaft part 90 of the pin 50 is inserted deeply in the through-hole 71 of the grommet 40, the projecting part 103 projecting from the lower face of the flange 100 is positioned on the upper face of the collar-form part 70. When the pin 50 is rotated in this state, the projecting part 103 and the projecting wall 73 projecting from the upper face of the collar-form part 70 contact with each other. When the pin 50 is rotated further, the flange 100 of the pin 50 is guided in the direction of floating up from the upper face of the collar-form part 70 of the grommet 40 by the contact between an inclined surface 104, to be described, of the projecting part 103 and either inclined surface 77 of the inclined surfaces 77 and 77 on both sides of the projecting wall 73.

(Leg Part 80)

Figure 3:
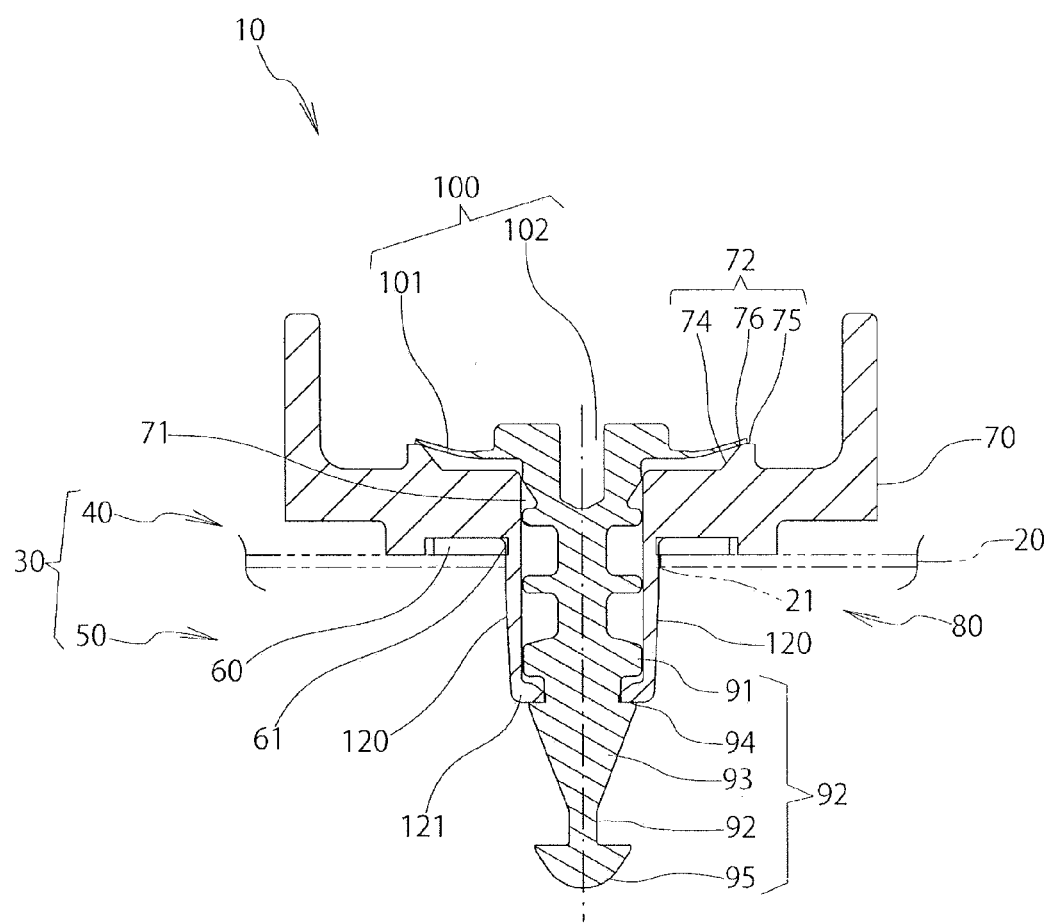
FIG. 3 is a cross-sectional view of the installed state of the clip.
Figure 4:
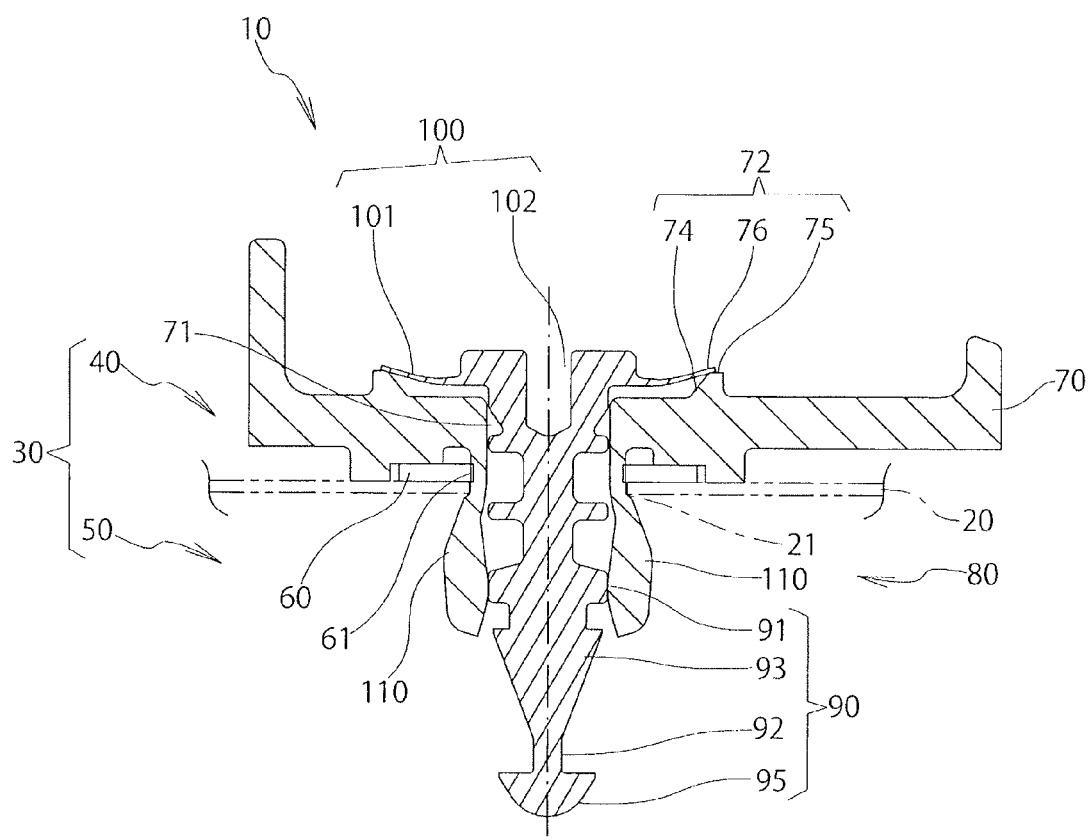
FIG. 4 is another cross-sectional view of the installed state of the clip.
Figure 8:
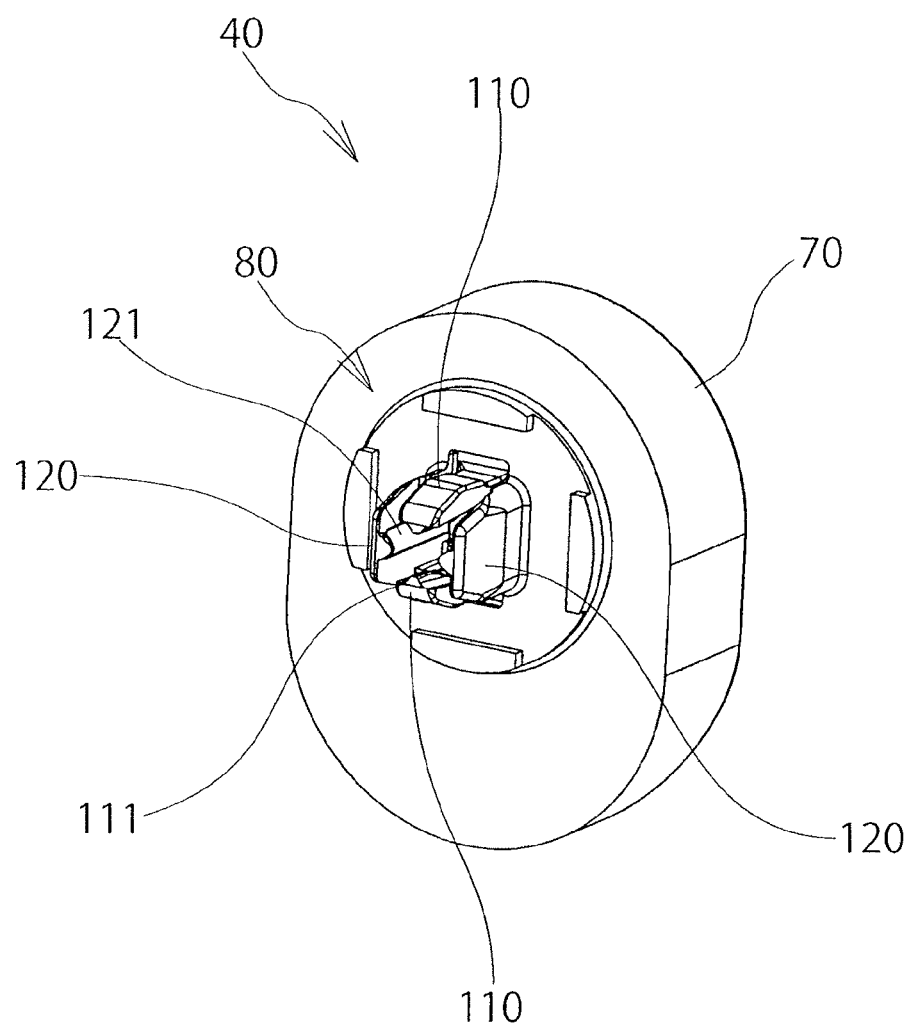
FIG. 8 is another perspective view of the grommet.
Figure 9:
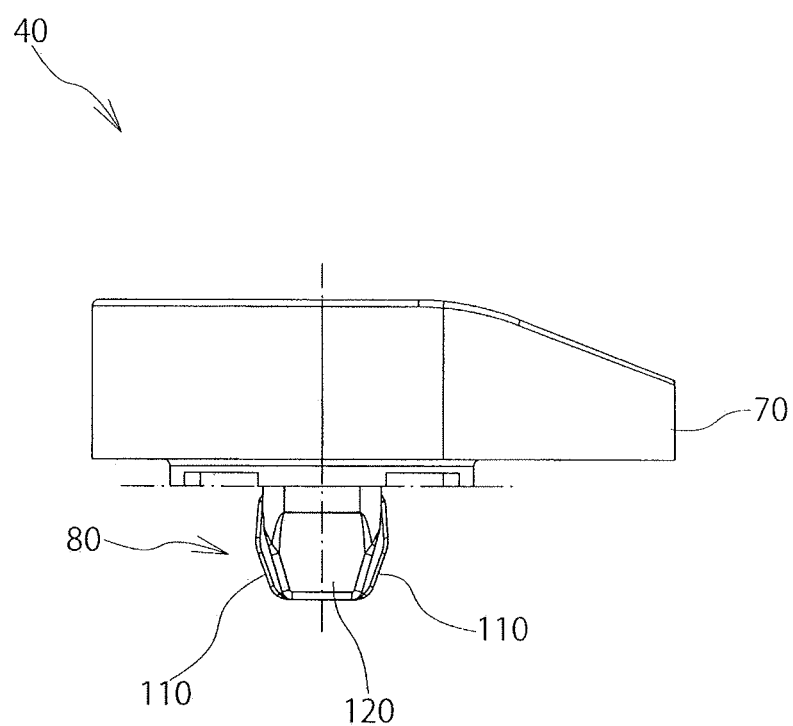
FIG. 9 is a front view of the grommet.
Figure 10:
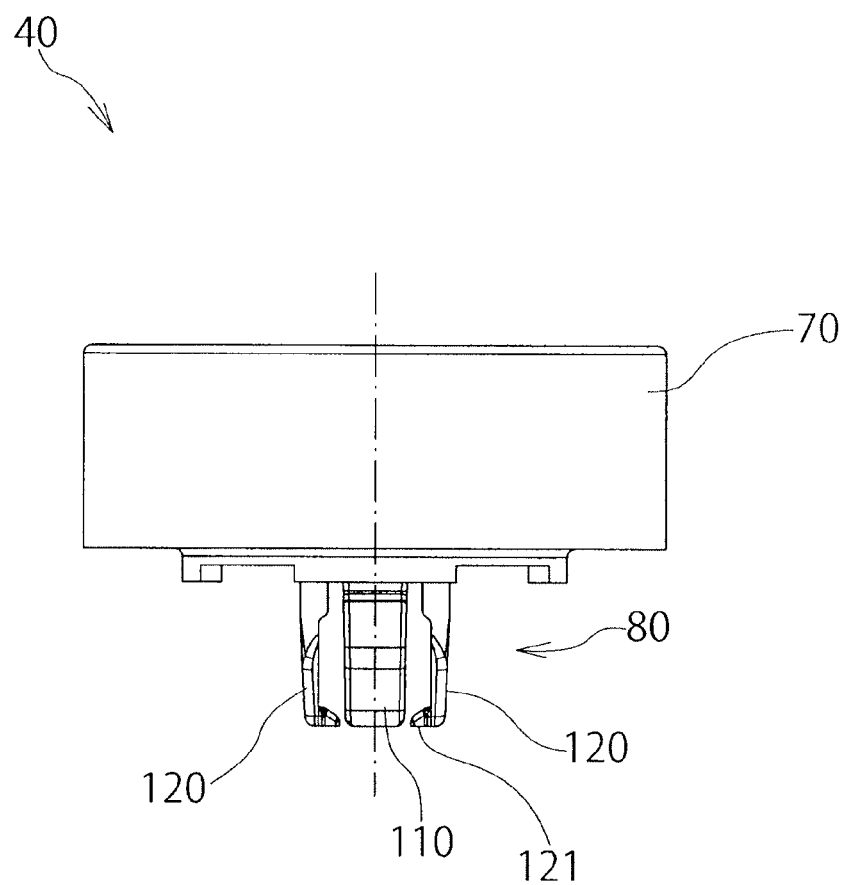
FIG. 10 is a side view of the grommet.
Figure 11:
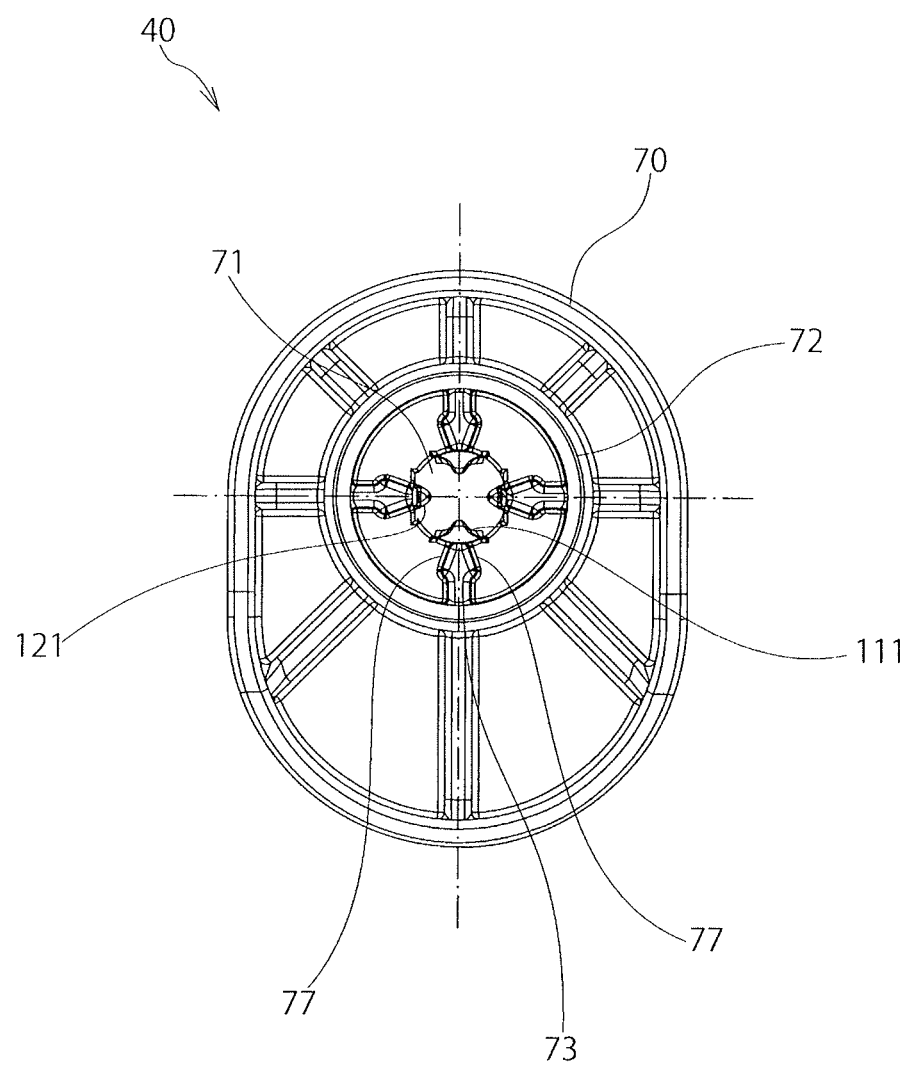
FIG. 11 is a plan view of the grommet.

The leg part 80 hangs down from the periphery of the through-hole 71, and has a plurality, for example a total of four, first and second elastic leg pieces 110 and 120 for coupling with the hole edge of the installation hole 21 provided on the base 20 by insertion of the pin 50, as illustrated in FIGS. 3, 4, and 8. The leg part 80 is formed with the total of four first and second elastic leg pieces 110 and 120 being arranged in a square-tubular shape, and the inner part of the tube connects through to the through-hole 71, as illustrated in FIGS. 8 and 12.

A total of four elastic leg pieces 110 and 120 are provided, but the present invention is not limited to this, and at least one pair is possible.

Also, the external shape of the leg part 80, being configured with the total of four first and second elastic leg pieces 110 and 120, nearly matches the internal shape of the installation hole 21 of the base 20.

Figure 12:
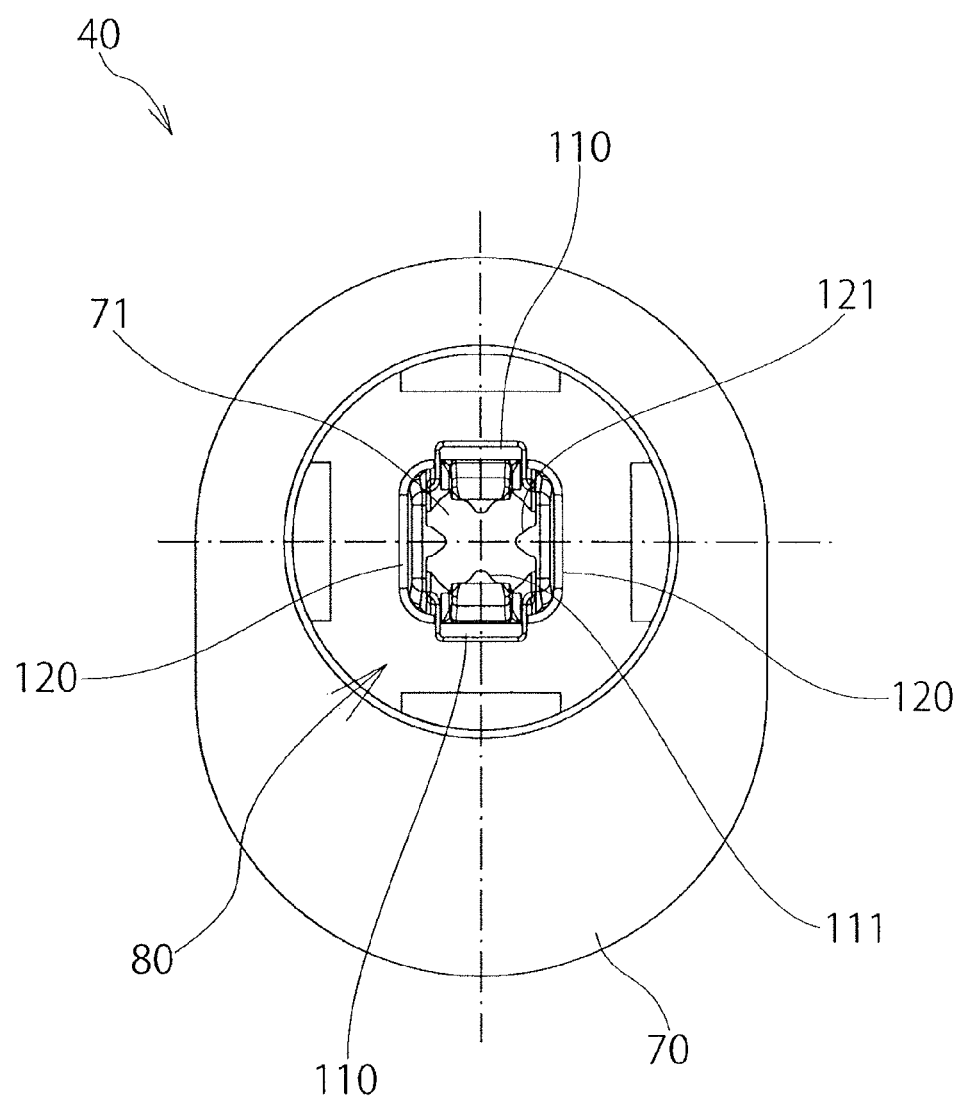
FIG. 12 is a bottom view of the grommet.
Figure 13:
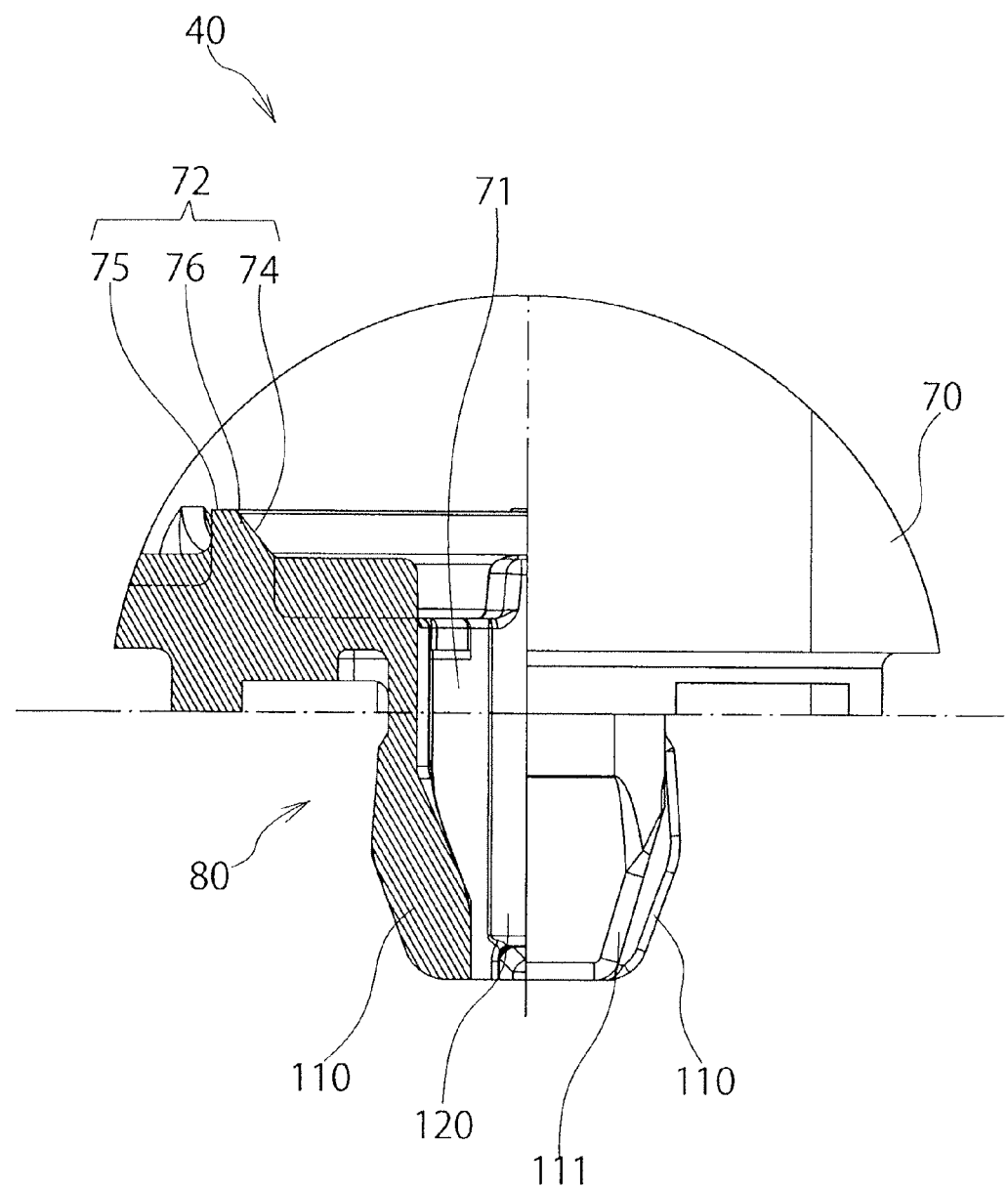
FIG. 13 is a front view in which half of the grommet is a cross-sectional view.

Two first elastic leg pieces 110 of the total of four first and second elastic leg pieces 110 and 120 are mutually opposite at a distance, and a vertically extending rib-form first raised part 111 is provided on each of the mutually opposite inner faces, as illustrated in FIGS. 8, 12, and 13.

The first elastic leg pieces 110 are inserted into the installation hole 21 of the base 20, and in that state, the shaft part 90 of the pin 50 to be described is inserted by way of the through-hole 71, whereby the rib-form first raised part 111 is pushed by the outer perimeter of the shaft part 90, whereby the first elastic leg pieces 110 are spread open in the direction of being moved apart from each other, as illustrated in FIG. 4. Therefore, the grommet 40 is fastened to the installation hole 21 of the base 20 by holding the base 20 from top to bottom between the lower face of the collar-form part 70 and the spread-open pair of first elastic leg pieces 110. That is, the bumper retainer is fastened to the base 20 because the grommet 40 is configured as a portion of the bumper retainer (not illustrated).

Figure 14:
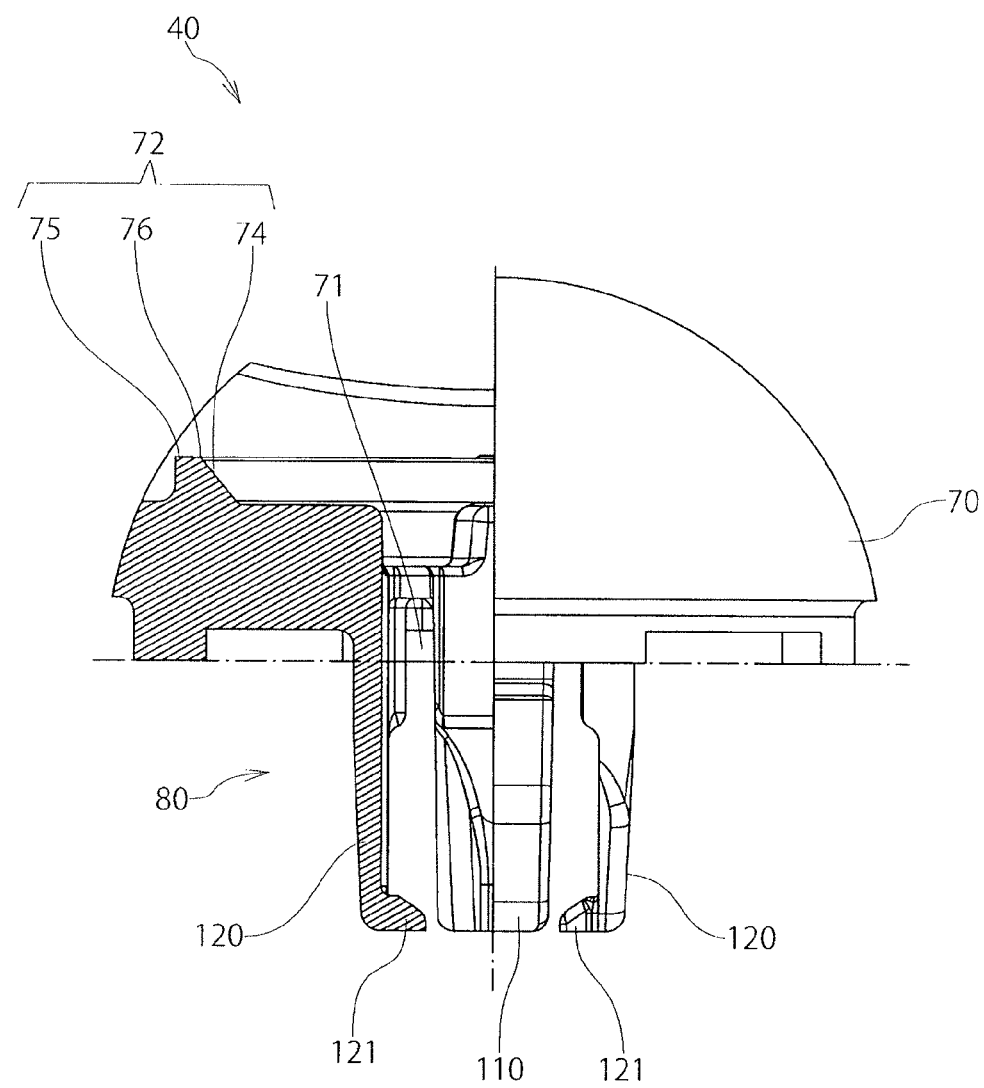
FIG. 14 is a side view in which half of the grommet is a cross-sectional view.

Meanwhile, two second elastic leg pieces 120 of the total of four first and second elastic leg pieces 110 and 120 are mutually facing each other at a distance, and a claw-form second raised part 121, being bent in an L-shape in cross-section, is provided on each of the mutually opposite inner faces of the leading-end parts, as illustrated in FIGS. 8, 12, and 14.

The second elastic leg pieces 120 are inserted into the installation hole 21 of the base 20, and in that state, the shaft part 90 of the pin 50 to be described is inserted by way of the through-hole 71, whereby the claw-form second raised part 121 is fitted into a recessed part 94, to be described, of the shaft part 90, whereby movement in the direction of insertion of the shaft part 90 of the pin 50 is prevented, as illustrated in FIG. 3.

(Shaft Part 90)

The shaft part 90 hangs down from the flange 100 to be described, as illustrated in FIGS. 15 to 18.

Specifically, the shaft part 90 hangs down from the lower face of the flange 100, the entire body is formed in a roughly square-columnar shape, and a leading-end part is pointed in a tapered form.

The shaft part 90 has the following parts, as illustrated in FIGS. 15 to 18.

The parts of the shaft part 90 are not limited to the following (1) to (6).

(1) Wide-diameter part 91

The wide-diameter part 91 is positioned at midcourse of the length of the shaft part 90, and is set to a comparatively wide diameter, as illustrated in FIGS. 15 to 18.

The wide-diameter part 91 spreads open the first elastic leg pieces 110 by coming into the interval of the first elastic leg pieces 110 when the shaft part 90 of the pin 50 is inserted into the hollow inner part of the leg part 80 by way of the through-hole 71, as illustrated in FIG. 4.

(2) Narrow-diameter part 92

The narrow-diameter part 92 is positioned on the leading-end part of the shaft part 90, and is set to a narrower diameter compared with the wide-diameter part 91, as illustrated in FIGS. 15 to 18.

Figure 6:
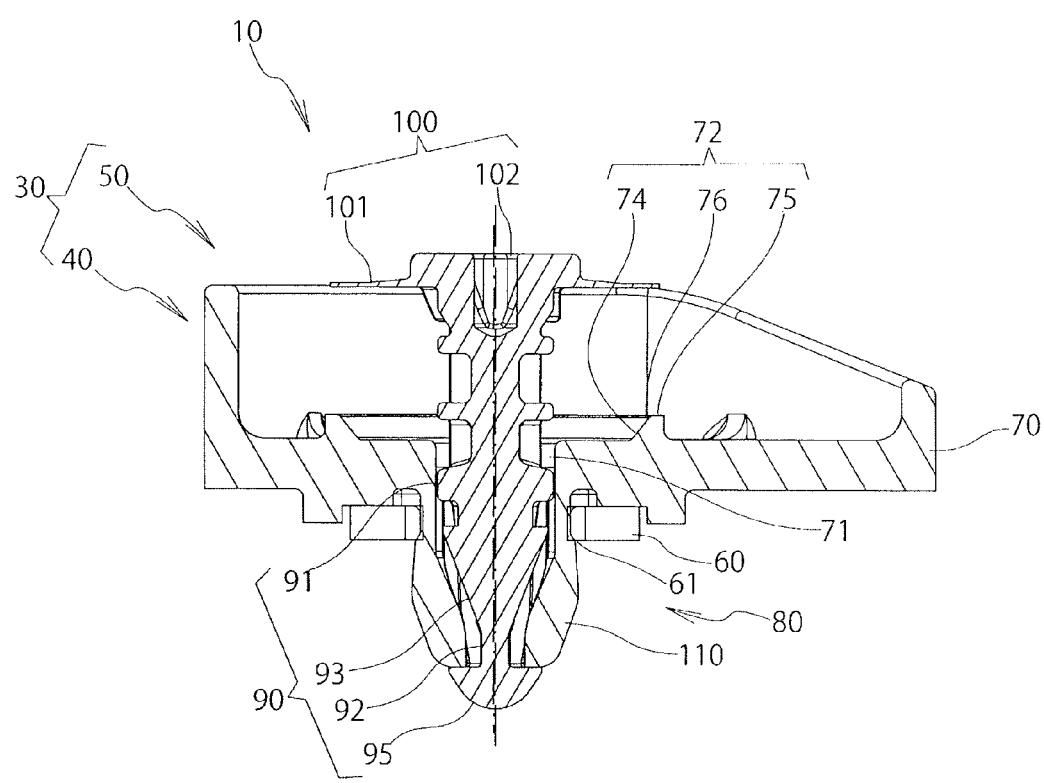
FIG. 6 is a cross-sectional view of the provisionally fastened state of the pin.
Figure 7:
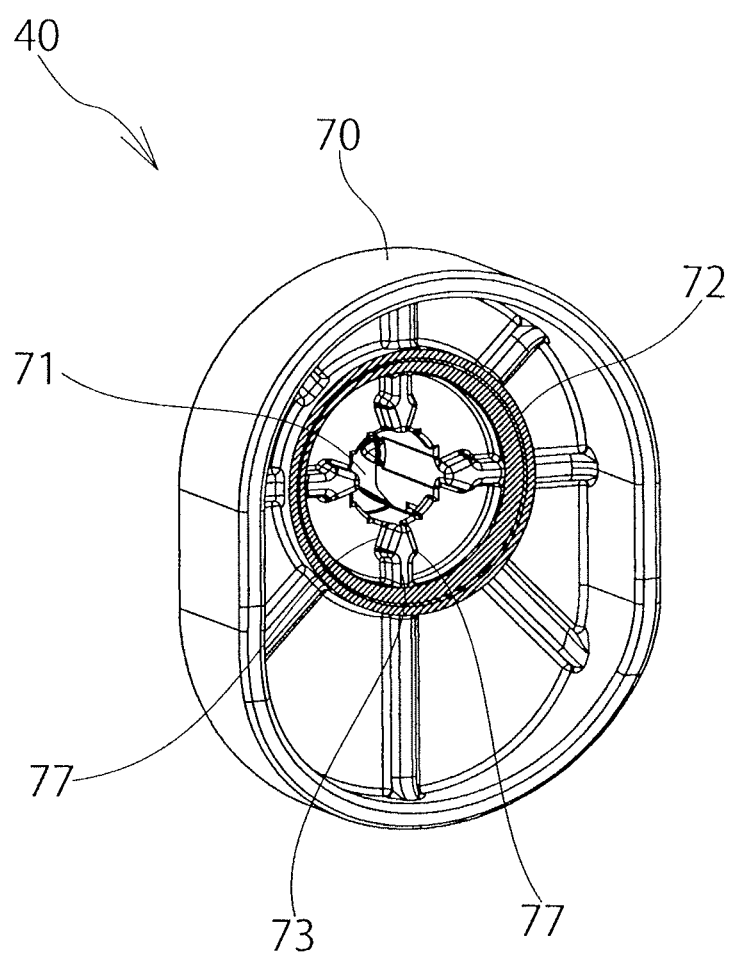
FIG. 7 is a perspective view of the grommet.

The first elastic leg pieces 110 are not spread open at a position where narrow-diameter part 92 comes into the interval of the first leg pieces 110, as illustrated in FIG. 6.

(3) Cam part 93

The cam part 93 is positioned between the wide-diameter part 91 and the narrow-diameter part 92, and becomes gradually thicker going toward the wide-diameter part 91 from the narrow-diameter part 92, as illustrated in FIGS. 15 to 18.

As illustrated in FIG. 6, when the shaft part 90 is pushed into the through-hole 71 from a position where the narrow-diameter part 92 has come into the interval of the first elastic leg pieces 110, the rib-form first raised parts 111 of the first elastic leg pieces 110 contact with the cam part 93. When the shaft part 90 is pushed in further, the rib-form first raised parts 111 of the first elastic leg pieces 110 are pushed by the outer perimeter of the cam part 93 because the cam part 93 becomes gradually thicker going toward the wide-diameter part 91, and the first elastic leg pieces 110 accordingly increase in diameter and reach the wide-diameter part 91 as illustrated in FIG. 4.

(4) Recessed part 94

The recessed part 94 is formed on the wide-diameter part 91 and sinks in a recessed form as illustrated in FIGS. 15 to 18.

The claw-form second raised part 121 of the second elastic leg piece 120 is fitted into the recessed part 94, whereby movement in the axial direction of the shaft part 90 of the pin 50 against the grommet 40 is prevented, as illustrated in FIG. 3.

(5) Slip-out-preventing part 95

The slip-out-preventing part 95 is positioned on the leading-end part of the shaft part 90 adjacent to the narrow-diameter part 92, is thicker than the narrow-diameter part 92, and extends in a tapered umbrella shape or conical shape, as illustrated in FIGS. 15 to 18.

The slip-out-preventing part 95 contacts with the rib-form first raised parts 111 of the first elastic leg pieces 110 when the shaft part 90 of the pin 50 is inserted into the hollow inner part of the leg part 80 by way of the through-hole 71, and passes through the interval of the first raised parts 111 in a manner so as to push open the first elastic leg pieces 110. When the slip-out-preventing part 95 passes through the interval of the first raised parts 111, the first elastic leg pieces 110 return by the return force of the resin, whereby the shaft part 90 is prevented from slipping out.

At the same time, the slip-out-preventing part 95 contacts with the claw-form second raised parts 121 of the second elastic leg pieces 120, and passes through the interval of the second raised parts 121 in a manner so as to push open the second elastic leg pieces 120. When the slip-out-preventing part 95 passes through the interval of the second raised parts 121, the second elastic leg pieces 120 return by the return force of the resin, whereby the shaft part 90 is prevented from slipping out.

(6) Guide rib 96

A total of four guide ribs 96 are formed following the axial direction of the shaft part 90, extending radially from the center of the shaft part 90, as illustrated in FIGS. 15 to 18.

The guide ribs 96 are fitted inside the gaps between adjacent first elastic leg pieces 110 and second elastic leg pieces 120 when the shaft part 90 of the pin 50 is inserted into the hollow inner part of the leg part 80 by way of the through-hole 71, so that the shaft part 90 of the pin 50 inside the hollow inner part of the leg part 80 does not rotate inadvertently.

(Flange 100)

The flange 100 extends in a disk form from the upper-end part of the shaft part 90, and its outer diameter is set larger than the inner diameter of the through-hole 71.

Specifically, the flange 100 has the following parts, as illustrated in FIGS. 15 to 19.

The parts of the flange 100 are not limited to the following (1) to (3).

(1) Elastic body 101

Figure 17:
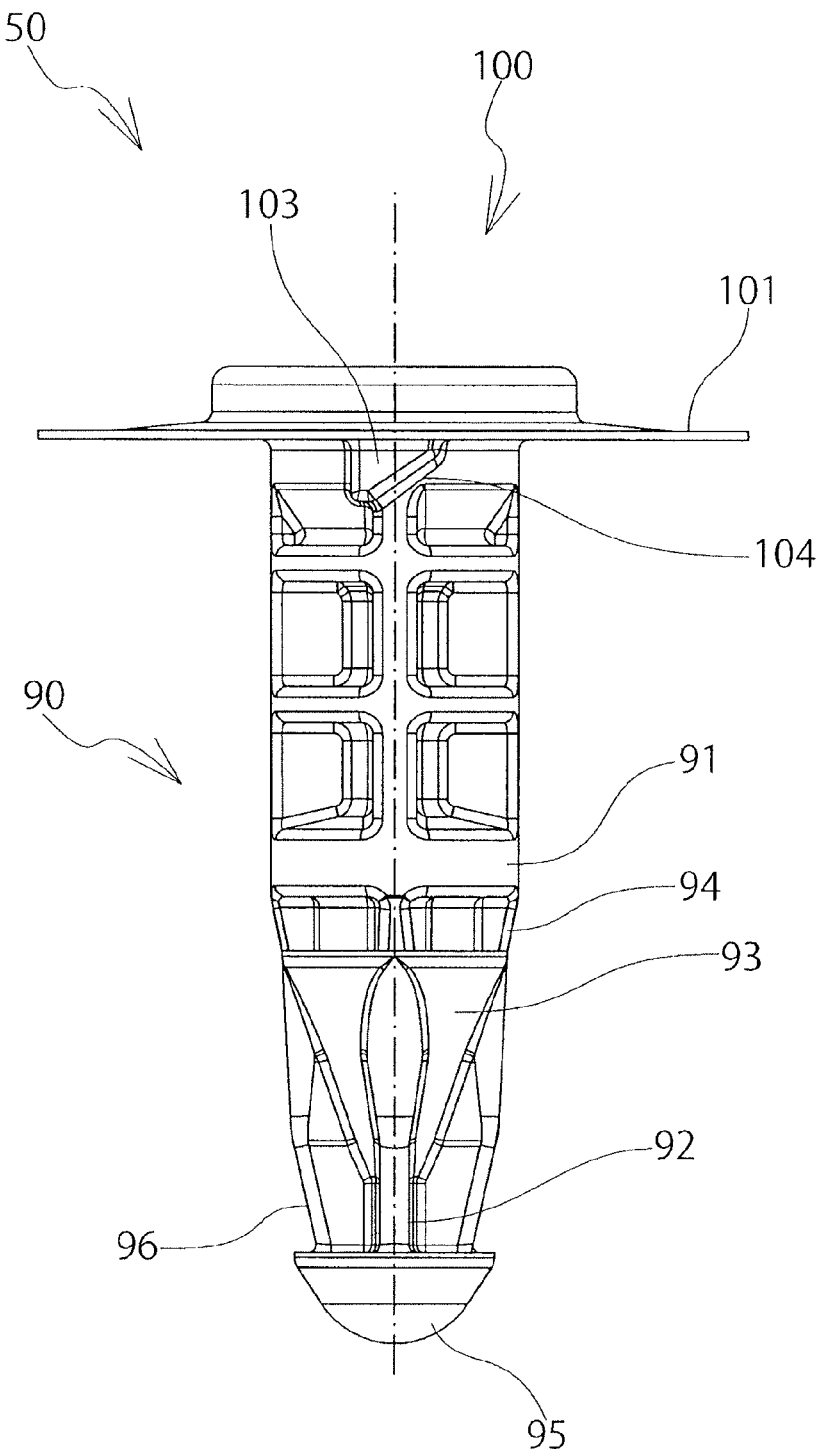
FIG. 17 is a front view of the pin.
Figure 18:
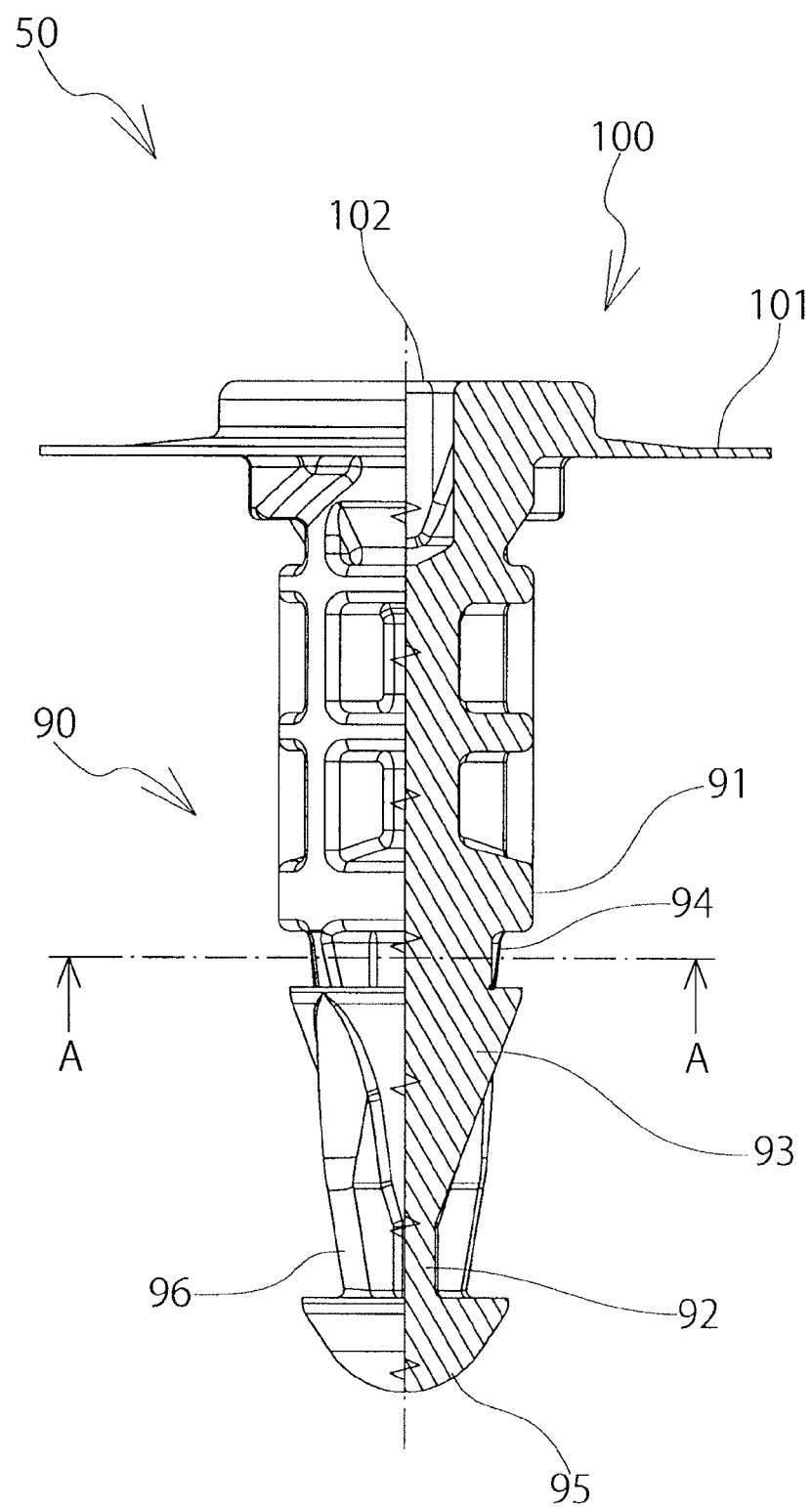
FIG. 18 is a side view in which half of the pin is a cross-sectional view.
Figure 19:
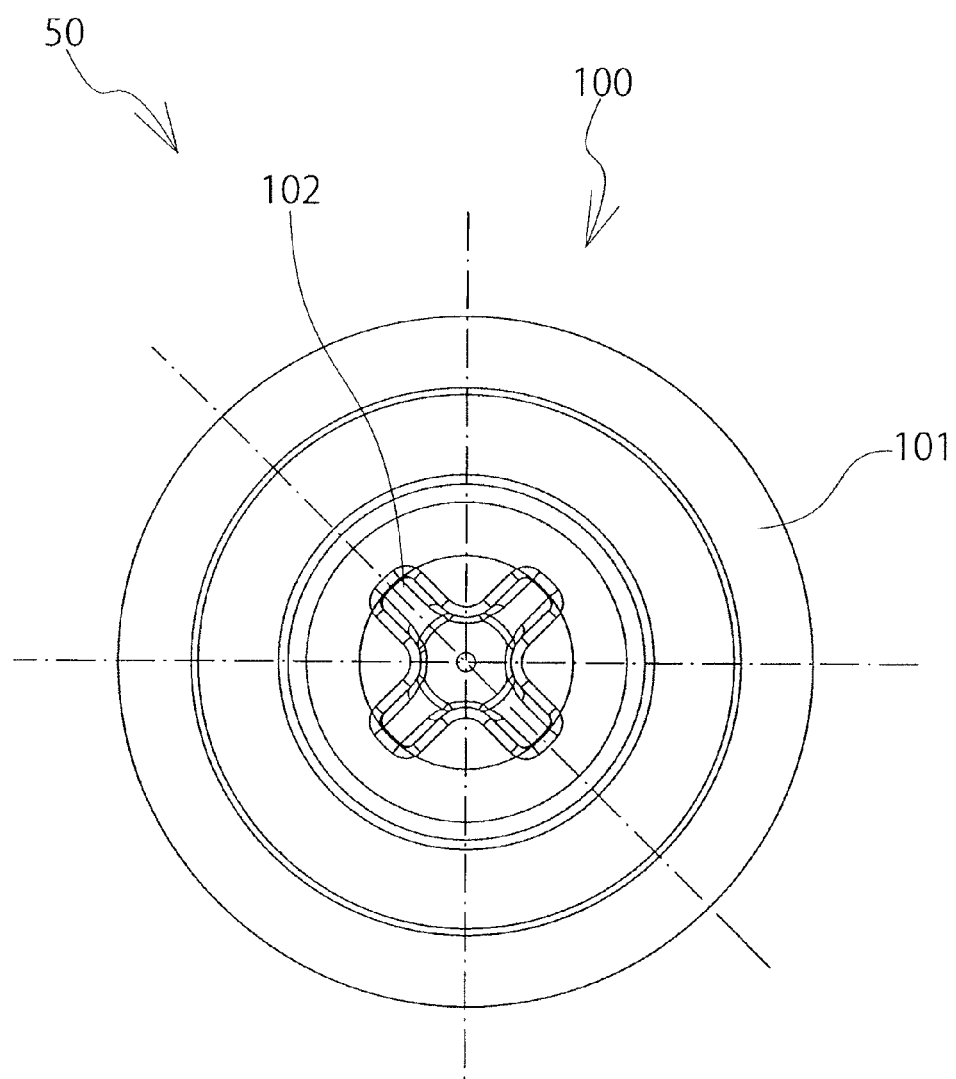
FIG. 19 is a plan view of the pin.

The elastic body 101 is thinly formed, extending in a straight shape from the outer perimeter of the flange 100, as illustrated in FIGS. 17 and 18.

Specifically, the elastic body 101 extends in an annular form from the lower side of the flange 100. In the case when the thickness of the flange 100 is set to 2 mm, for example, the thickness of the elastic body 101 is set to one eighth, being 0.25 mm.

The elastic body 101 contacts with the projecting wall 73 projecting from the upper face of the collar-form part 70 of the grommet 40. That is, when the shaft part 90 of the pin 50 is inserted into the through-hole 71 of the grommet 40, the lower face of the elastic body 101 contacts with the top face 75 being the upper wall of the wall part 72 projecting from the upper face of the collar-form part 70. When the shaft 90 is inserted more deeply, the lower face of the elastic body 101 is pushed by the angular connecting part 76 between the top face 75 and the inclined surface 74 being positioned on the inner side face of the wall part 72, and becomes in a bent-back state as illustrated in FIGS. 3 and 4. In this position where the flange 101 is in the bent-back state, as illustrated in FIG. 3, the claw-form second raised parts 121 of the second elastic leg pieces 120 of the grommet 40 are fitted into the recessed parts 94 of the shaft part 90 of the pin 50, whereby movement in the axial direction of the shaft part 90 of the pin 50 against the grommet 40 is prevented. Therefore, the state in which the elastic body 101 is pressed against the angular connecting part 76 in the bent-back state is maintained.

(2) Jig-coupling part 102

The jig-coupling part 102, although not illustrated, is for coupling with, for example, a "+" (plus) screwdriver or other jig, and has, for example, a + (plus) slot.

A screwdriver is illustrated as an example of a jig, but [the present invention] is not limited to this. Also, the jig-coupling part 102 is not limited to a + slot.

(3) Projecting part 103

Figure 15:
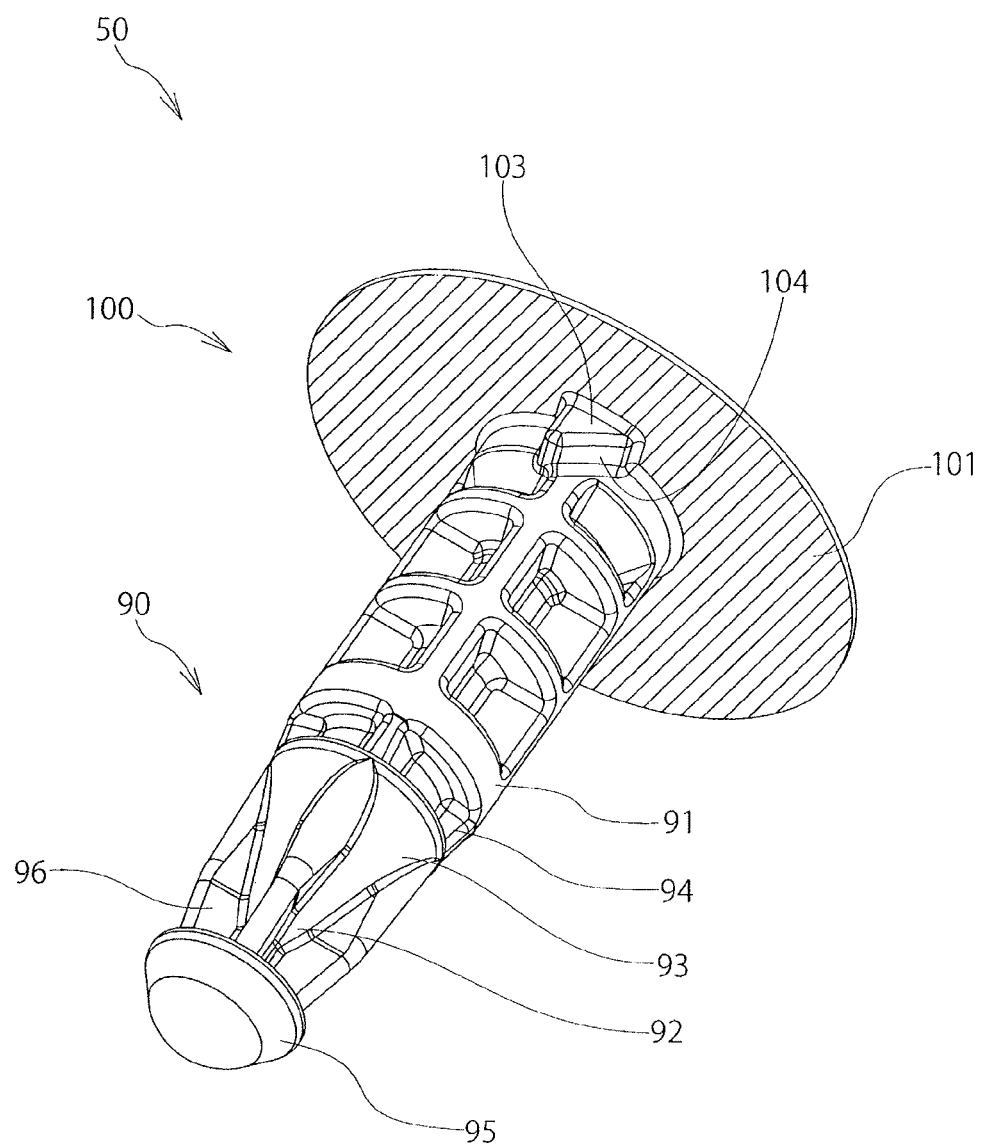
FIG. 15 is a perspective view of the pin.
Figure 16:
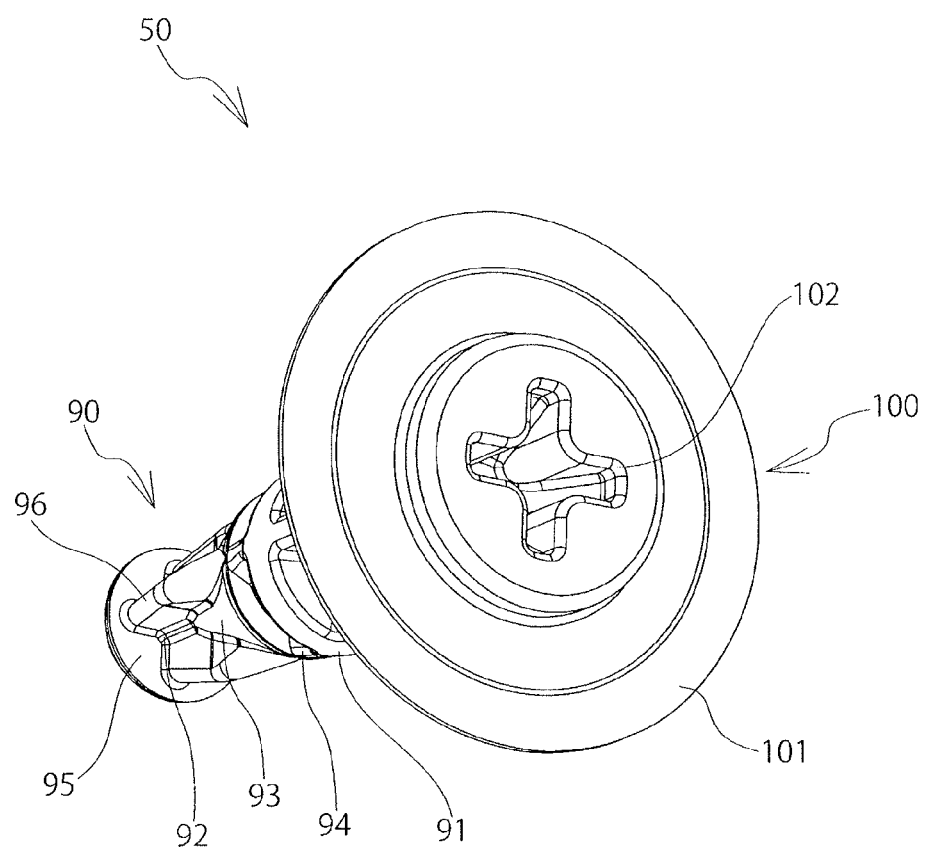
FIG. 16 is another perspective view of the pin.
Figure 20:
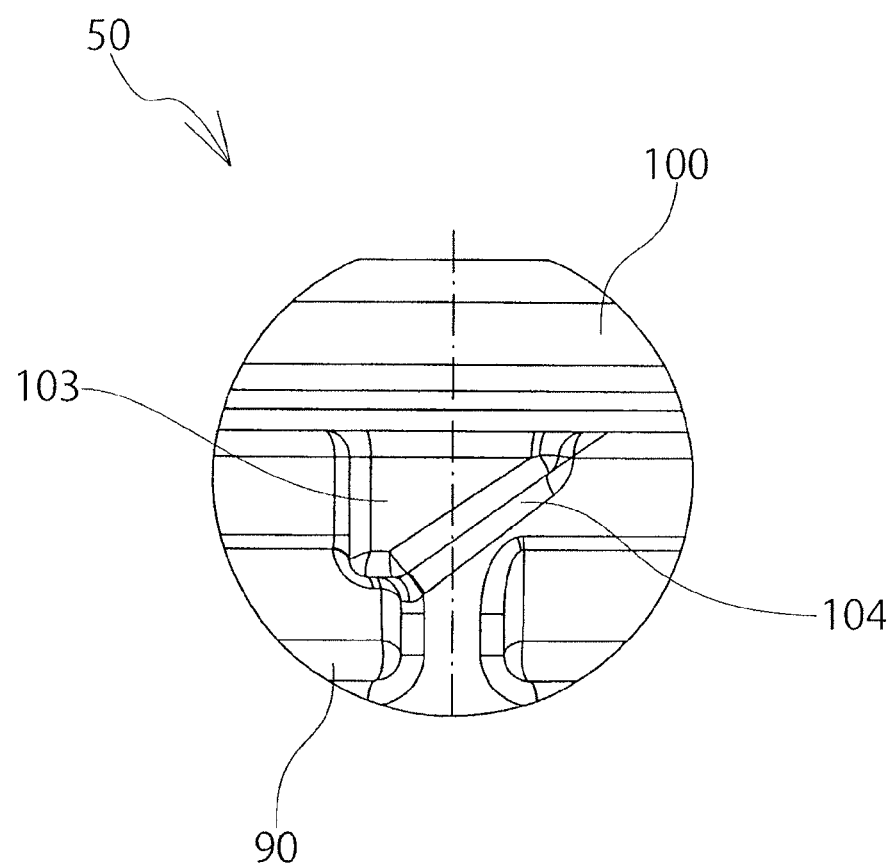
FIG. 20 is a partially enlarged view of the pin.
Figure 21:
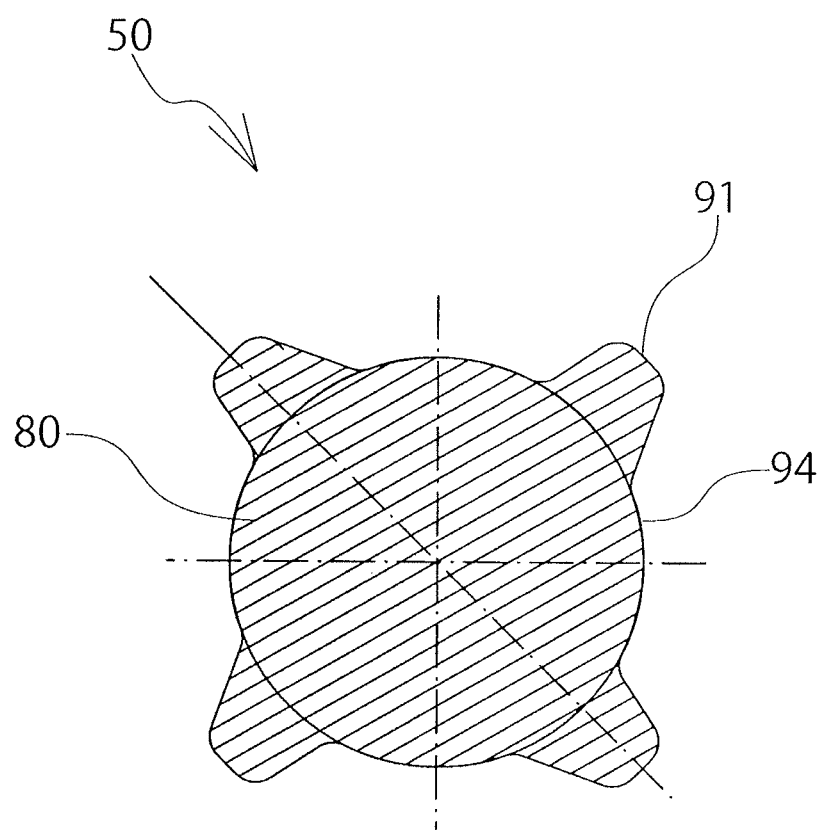
FIG. 21 is a cross-sectional view along the line A-A in FIG. 18.

The projecting part 103 is positioned on the lower side of the flange 100, projects outward in the radial direction from the outer perimeter of the shaft part 90, and has at least one inclined surface 104, as illustrated in FIGS. 15, 17, and 20.

Specifically, the projecting part 103 is formed in a triangular-columnar shape, and the inclined surface 104 is oriented in the outer perimeter direction of the shaft part 90. A pair of projecting parts 103 is formed in the diameter direction of the shaft part 90.

A pair of projecting parts 103 is formed, but the present invention is not limited to this, and one or three or more may be formed. Also, one inclined surface 104 is formed on one side in the circumferential direction of the flange 100, but the present invention is not limited to this, and although not illustrated, two inclined surfaces may be formed on both sides in the circumferential direction of the flange 100, and the projecting parts 103 may be formed in symmetrical shapes with respect to front to back in the circumferential direction of the flange 100. Thus, by forming the projecting parts in symmetrical shapes with respect to front to back in the circumferential direction, the production of the pin 50 is made simple and convenient, and directionality in the method of rotation of the pin 50 is eliminated, whereby the operability can be improved.

The projecting part 103 contacts with the projecting wall 73 projecting from the upper face of the collar-form part 70 of the grommet 40, as illustrated in FIG. 22. That is, when the shaft part 90 of the pin 50 is inserted deeply into the through-hole 71 of the grommet 40, the projecting part 103 projecting from the lower face of the flange 100 is positioned on the upper face of the collar-form part 70. When the pin 50 is rotated in this state, the projecting part 103 and the projecting wall 73 projecting from the upper face of the collar-form part 70 come into contact with each other. When the pin 50 is rotated further, the flange 100 of the pin 50 is guided in the direction of floating up from the upper face of the collar-form part 70 of the grommet 40 by the contact between the inclined surface 104 of the projecting part 103 and either inclined surface 77 of the inclined surfaces 77 and 77 on both sides of the projecting wall 73.

(Method of Installation of the Clip 30)

The method of installation of the clip 30 including the grommet 40 and the pin 50 having the above configuration is next described.

First, the pin 50 and the packing 60 are assembled in advance on the grommet 40.

The grommet 40 may be installed with the pin 50 and the packing 60 when installing on the base 20.

First, the leg part 80 of the grommet 40 is inserted correctly in the center hole 61 of the packing 60, and the packing 60 is positioned beneath the lower face of the collar-form part 70.

Figure 5:
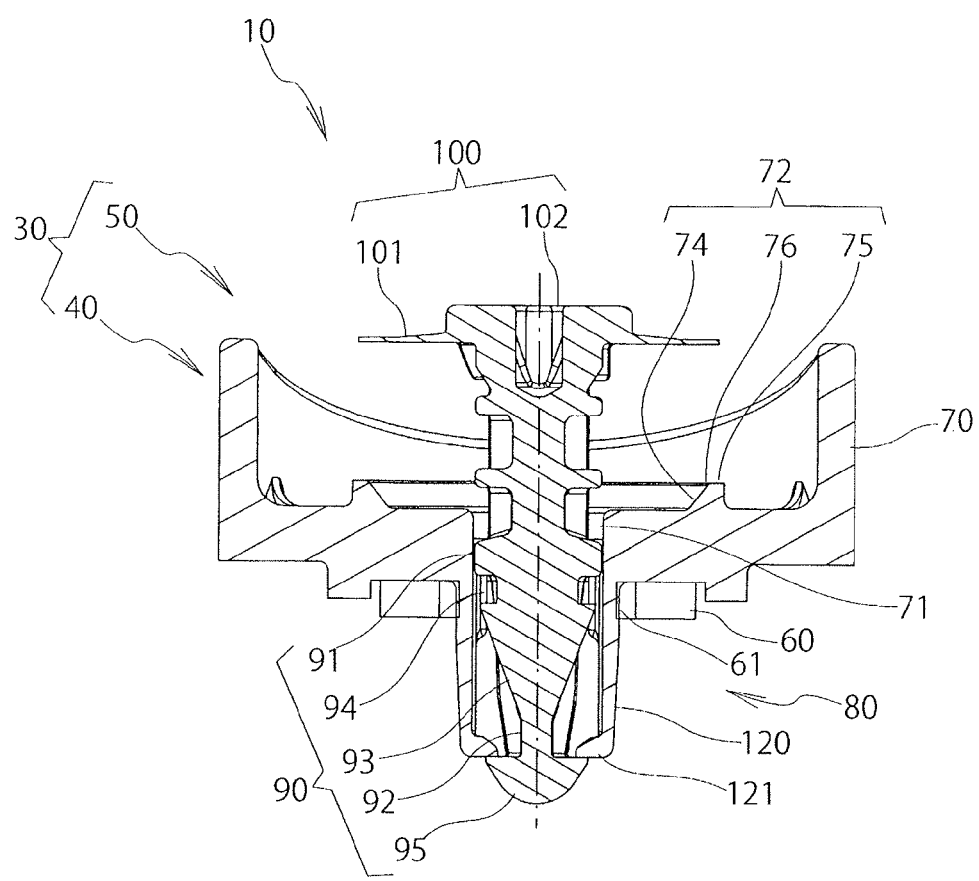
FIG. 5 is a cross-sectional view of the provisionally fastened state of the pin.

Next, the shaft part 90 of the pin 50 is inserted correctly in the through-hole 71 of the grommet 40 as illustrated in FIGS. 5 and 6.

When the shaft part 90 of the pin 50 is inserted, the shaft part 90 of the pin 50 is inserted into the hollow inner part of the leg part 80 by way of the through-hole 71. After that, the slip-out-preventing part 95 on the leading-end part of the shaft part 90 contacts with the first raised parts 111 of the first elastic leg pieces 110 and the second raised parts 121 of the second elastic leg pieces 120, and passes through the interval of the first raised parts 111 and the interval of the second raised parts 121 in a manner so as to push open the first elastic leg pieces 110 and the second raised parts 121, and the first raised parts 111 and the second raised parts 121 are positioned on the narrow-diameter part 92 of the shaft part 90. Therefore, the shaft part 90 does not slip out from the hollow inner part of the leg part 80, and the pin 50 is provisionally fastened to the grommet 40.

Next, the leg part 80 of the grommet 40 is inserted correctly in the installation hole 21 of the base 20 as illustrated in FIGS. 3 and 4.

When the leg part 80 of the grommet 40 is inserted, the lower face of the collar-form part 70 contacts with the upper surface of the base 20 by way of the packing 60.

After that, the flange 100 of the pin 50 is pushed into the grommet 40 as illustrated in FIGS. 3 and 4.

When the pin 50 is pushed in, the shaft part 90 advances through the hollow inner part of the leg part 80, and the first elastic leg pieces 110 of the grommet 40 are pushed open by the wide-diameter part 91, whereby outer diameter of the leg part 80 of the grommet 40 is spread open as illustrated in FIG. 4. Therefore, the grommet 40 is fastened to the installation hole 21 of the base 20 by holding the base 20 from top to bottom between the lower face of the collar-form part 70 and the spread-open pair of first elastic leg pieces 110. That is, the bumper retainer is fastened to the base 20 because the grommet 40 is configured as a portion of the bumper retainer (not illustrated).

At the same time, the claw-form second raised parts 121 of the second elastic leg pieces 120 of the grommet 40 are fitted inside the recessed parts 94 of the pin 50 as illustrated in FIG. 3, whereby movement in the direction of insertion of the shaft part 90 of the pin 50 is prevented.

Meanwhile, the elastic body 101 of the pin 50 contacts with the projecting wall 73 projecting from the upper face of the collar-form part 70 of the grommet 40 as illustrated in FIGS. 3 and 4. That is, when the shaft part 90 of the pin 50 is inserted into the through-hole 71 of the grommet 40, the lower face of the elastic body 101 contacts with the top face 75 being the upper face of the wall part 72 projecting from the upper face of the collar-form part 70. When the shaft part 90 is inserted more deeply, the lower face of the elastic body 101 is pushed by the angular connecting part 76 between the top face 75 and the inclined surface 74 being positioned on the inner side face of the wall part 72, and becomes in a bent-back state. In this position where the elastic body 101 is in the bent-back state, as illustrated in FIG. 3, the claw-form second raised parts 121 of the second elastic leg pieces 120 of the grommet 40 are fitted into the recessed parts 94 of the shaft part 90 of the pin 50, whereby movement in the axial direction of the shaft part 90 of the pin 50 against the grommet 40 is prevented. Therefore, the state in which the elastic body 101 is pressed against the angular connecting part 76 in the bent-back state is maintained.

(Method of Removal of the Clip 30)

The method of removal of the installed clip 30, on the other hand, is described.

Although not illustrated, a "+" (plus) screwdriver or other jig is coupled in the jig-coupling part 102, being a + (plus) slot, of the pin 50, and the flange 100 of the pin 50 is rotated in one direction, for example, counterclockwise.

When the flange 100 of the pin 50 is rotated, the projecting part 103 projecting from the lower face of the flange 100 contacts with the projecting wall 73 projecting from the upper face of the collar-form part 70.

When the flange 100 of the pin 50 is rotated further, as illustrated in FIG. 22, the flange 100 of the pin 50 is guided in the direction of floating up from the upper face of the collar-form part 70 of the grommet 40 by the contact between the inclined surface 104 of the projecting part 103 and either inclined surface 77 of the inclined surfaces 77 and 77 on both sides of the projecting wall 73.

When the flange 100 of the pin 50 ascends, the shaft part 90 moves in the direction of coming out from the hollow inner part of the leg part 80, that is, upward, whereby the claw-form second raised parts 121 of the second elastic leg pieces 120 of the grommet 40, having been fitted in the recessed parts 94 of the shaft 90, are decoupled. Therefore, the first elastic leg pieces 110 of the grommet 40 move from the wide-diameter part 91 to the narrow-diameter part 92 of the shaft part 90, whereby the outer diameter of the leg part 80 of the grommet 40 contracts.

Therefore, the leg part 80 of the grommet 40 can be pulled out from the installation hole 21 of the base 20.

At this time, the pin 50 maintains the state of being provisionally fastened to the grommet 40.

(Second Embodiment)

Figure 23:
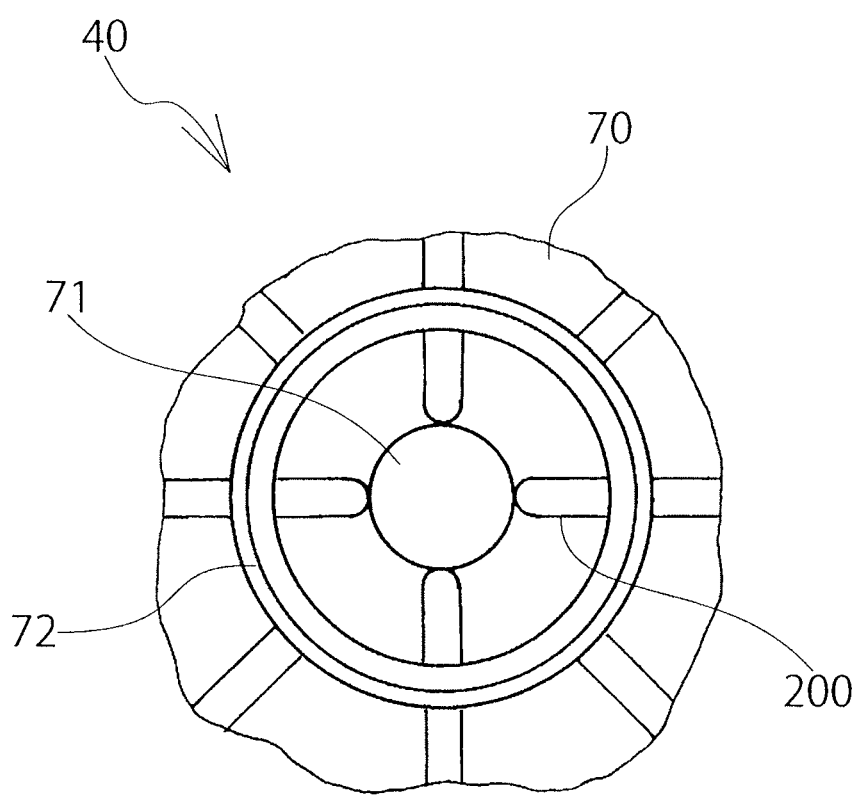
FIG. 23 is a partial plan view of the grommet for describing a second embodiment of the present invention.

A second embodiment of the present invention is next described using FIG. 23.

A characteristic of the present embodiment is that a projecting wall 200 projecting from the upper face of the collar-form part 70 of the grommet 40 is formed as an oblong in planar section, as illustrated in FIG. 23.

The oblong projecting wall 200 has a symmetrical shape with respect to front to back in the circumferential direction of the collar-form part 70.

Also, in the description of the present embodiment, the same symbols are used for the same portions of the configuration as in the first embodiment previously described using FIGS. 1 to 22, and the descriptions are omitted.

(Third Embodiment)

Figure 24:
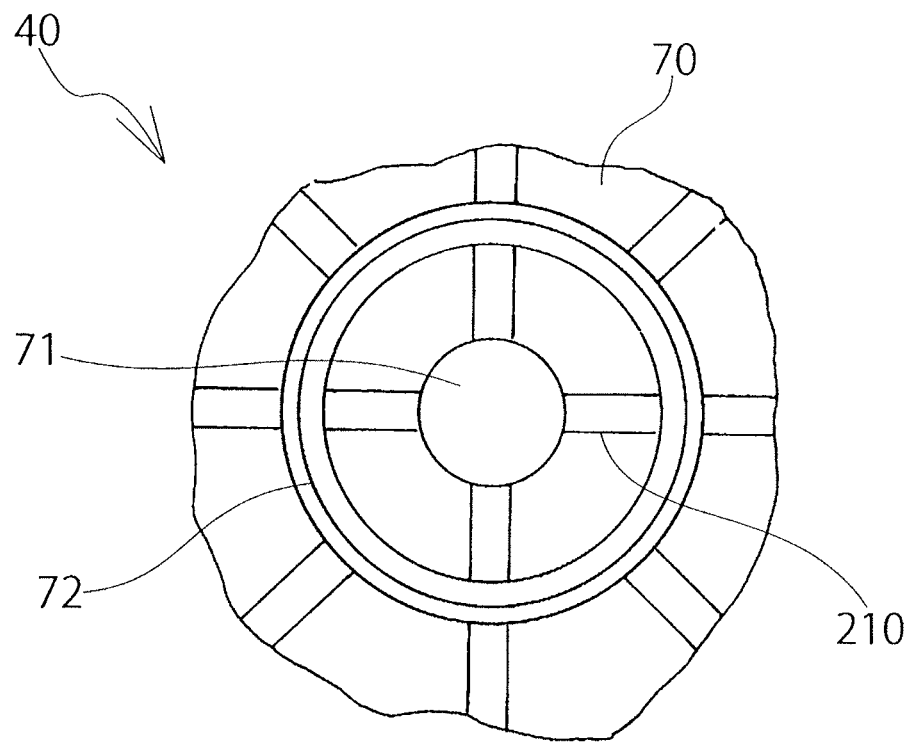
FIG. 24 is a partial plan view of the grommet for describing a third embodiment of the present invention.

A third embodiment of the present invention is next described using FIG. 24.

A characteristic of the present embodiment is in that a projecting wall 210 projecting from the upper face of the collar-form part 70 of the grommet 40 is formed as a rectangle in planar section, as illustrated in FIG. 24.

The rectangular projecting wall 210 has a symmetrical shape with respect to front to back in the circumferential direction of the collar-form part 70.

The projecting wall 73 is formed in an "arrowhead" or "arrow mark" shape in planar section in the first embodiment previously described using FIGS. 1 to 22, the projecting wall 200 is formed as an oblong in planar section in the second embodiment described using FIG. 23, and the projecting wall 210 is formed as a rectangle in planar section in the present embodiment, but [the present invention] is not limited to these shapes, as it is sufficient that the projecting walls 73, 200, and 210 have symmetrical shapes with respect to front to back in the circumferential direction of the collar-form part 70.

Also, in the description of the present embodiment, the same symbols are used for the same portions of the configuration as in the first embodiment previously described, and the descriptions are omitted.

(Fourth Embodiment)

Figure 25:
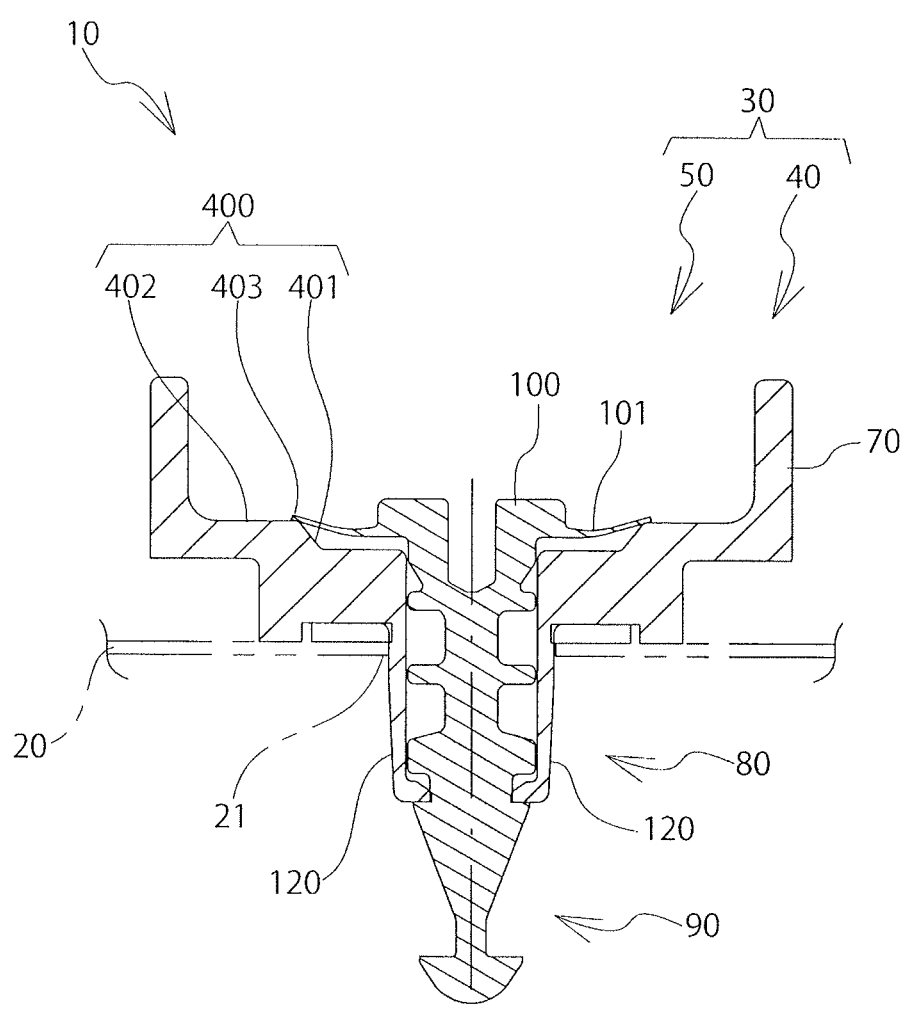
FIG. 25 is a cross-sectional view of the installed state of the clip, illustrating a fourth embodiment of the present invention.
Figure 26:
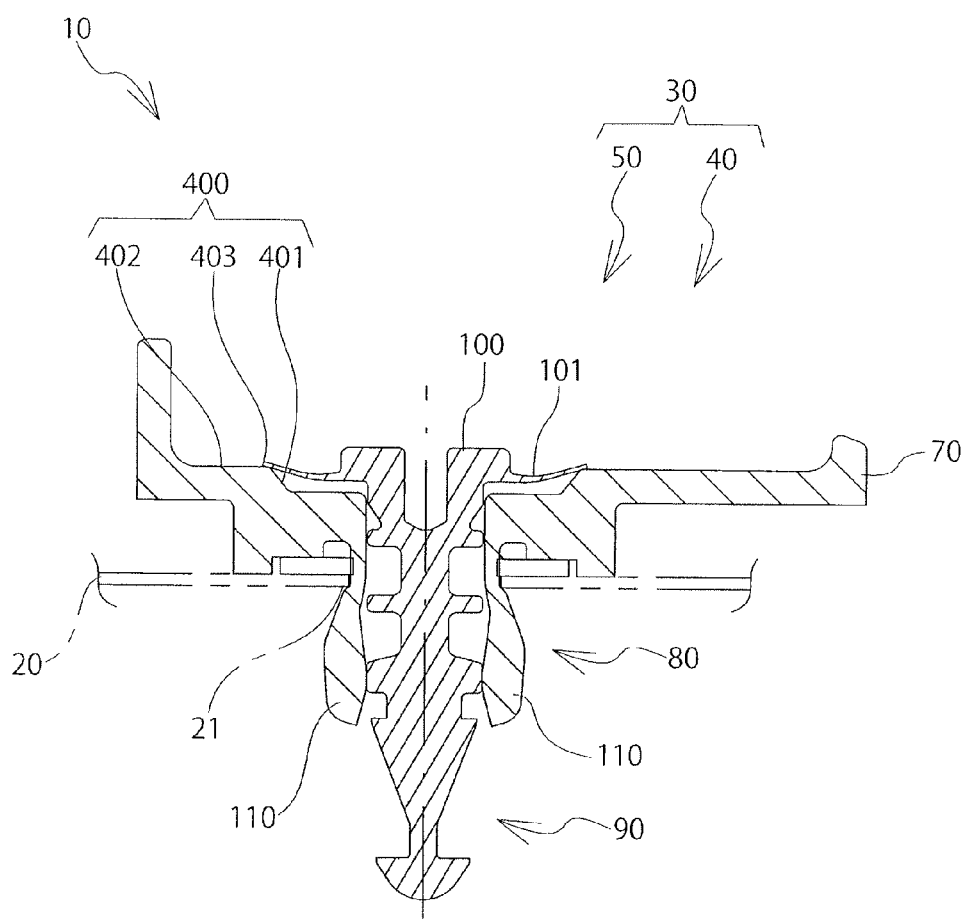
FIG. 26 is another cross-sectional view of the installed state of the clip, illustrating a fourth embodiment of the present invention.

A fourth embodiment of the present invention is next described using FIGS. 25 and 26.

A characteristic of the present embodiment is that a wall part 400 projecting from the upper face of the collar-form part 70 of the grommet 40 is formed in a step form as illustrated in FIGS. 25 and 26, rather than being in a rib form as is the wall part 72 in the first embodiment previously described using FIGS. 1 to 22.

That is, the wall part 400 is configured with an inclined surface 401 being inclined diagonally upward in the outer perimeter direction from the upper face of the collar-form part 70, a top face 402 being an upper face of the wall part 400, and a connecting part 403 being positioned in a corner part between the inclined surface 401 and the top face 402.

Also, in the description of the present embodiment, the same symbols are used for the same portions of the configuration as in the first embodiment, and the descriptions are omitted.

(Fifth Embodiment)

A fifth embodiment of the present invention is next described using FIGS. 27 to 32.

A characteristic of the present embodiment is firstly that the "projecting part 103" and the "inclined surface 104" of the pin 50 (leg member) of the first embodiment previously described using FIGS. 1 to 22 are omitted, and in place of these, a "lock-releasing part 500" is formed in the circumferential direction of the recessed part 94 of the pin 50 (leg member), and the lock-releasing part 500 is made as a "projecting part," as illustrated in FIGS. 27 and 29 to 32.

Secondly, a characteristic of the present embodiment is that the "projecting wall 73" and the "inclined surface 77" of the grommet 40 (installation member) of the first embodiment previously described are omitted, and in place of these, the "second raised part 121" of the second elastic leg piece 120 of the grommet 40 (installation member) is used also as a "projecting wall," as illustrated in FIGS. 27 to 32.

Figure 27:
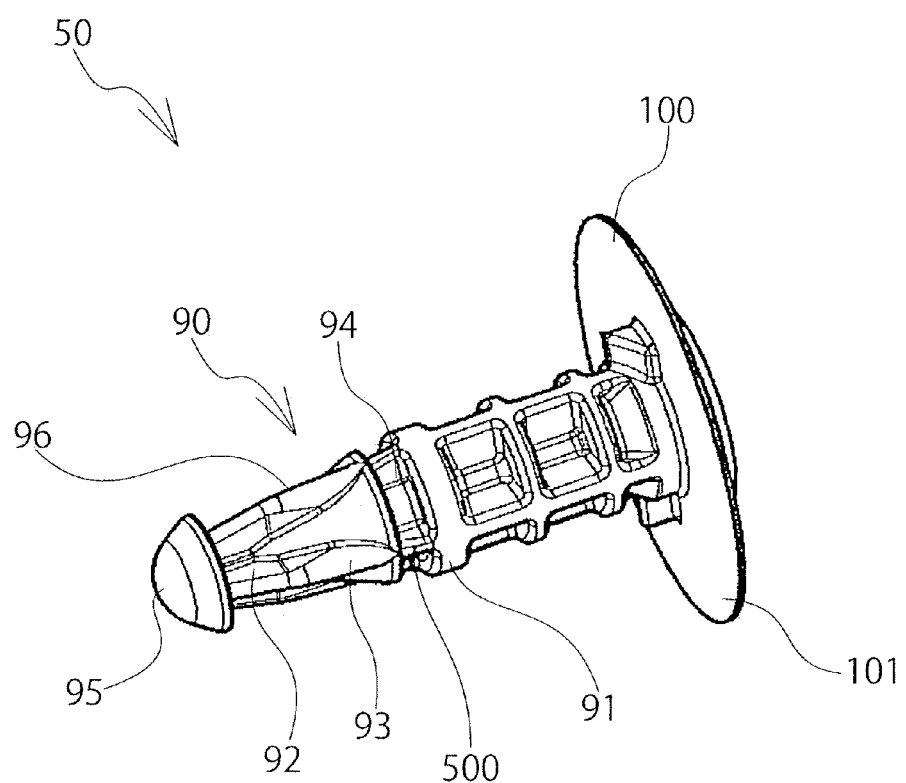
FIG. 27 is a perspective view of the pin, illustrating a fifth embodiment of the present invention.
Figure 28:
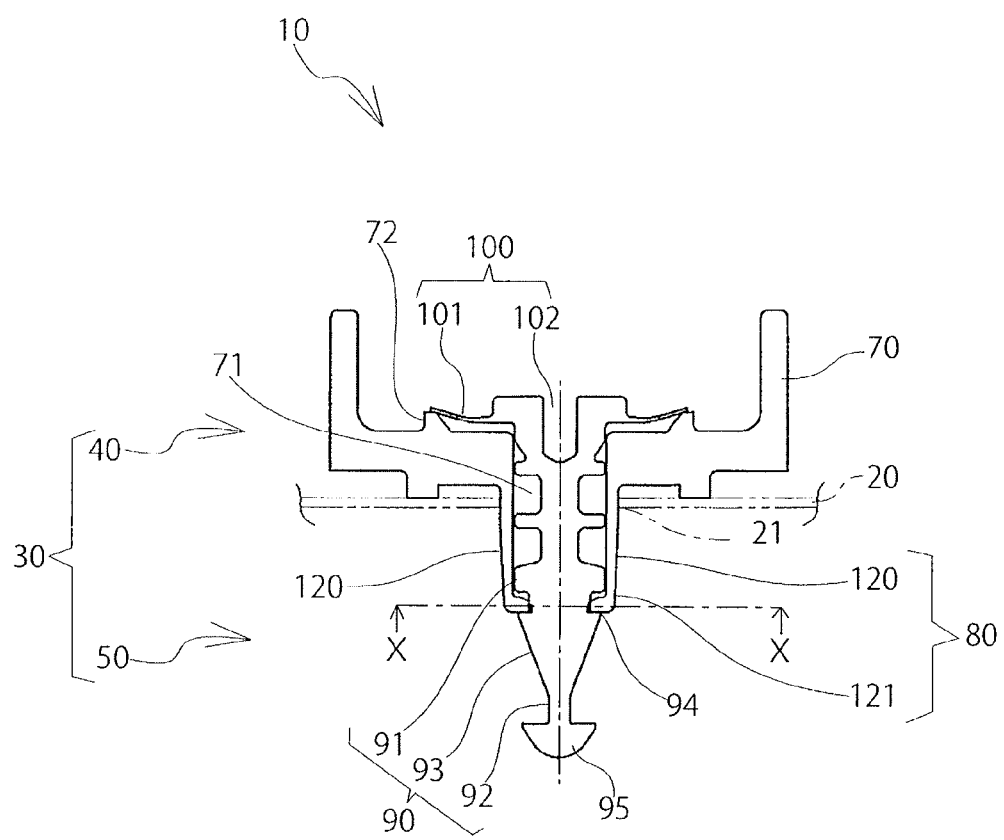
FIG. 28 is a cross-sectional view of the installed state of the clip, illustrating a fifth embodiment of the present invention.
Figure 29:
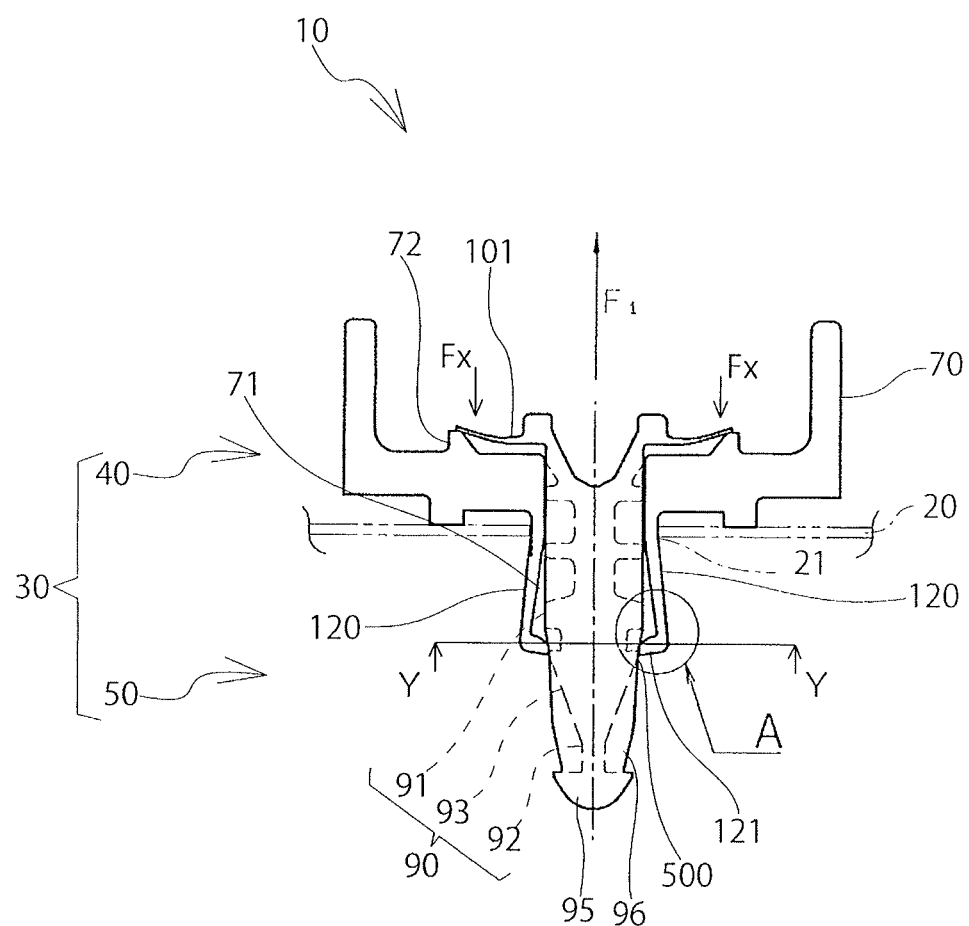
FIG. 29 is a cross-sectional view illustrating a state in which the pin in FIG. 28 is rotated.
Figure 30:
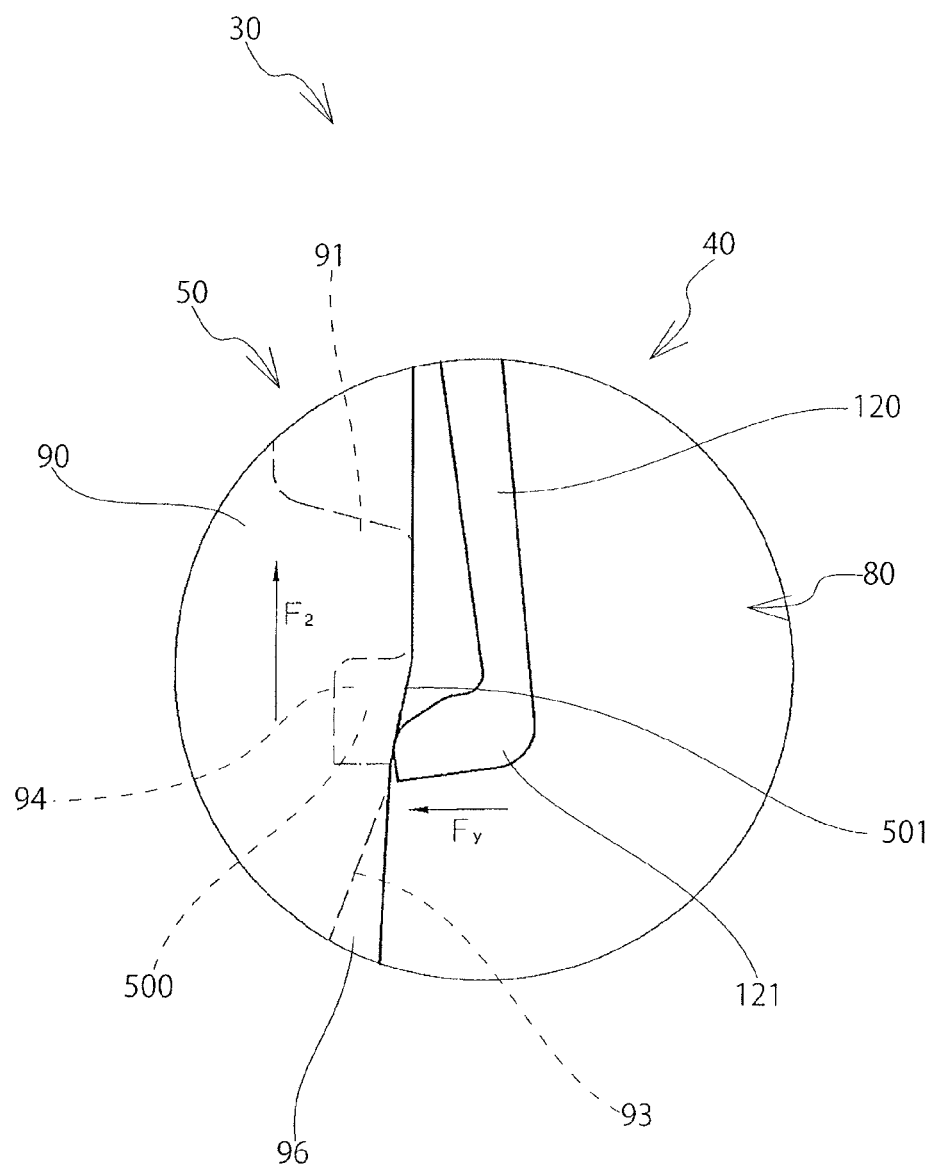
FIG. 30 is an enlarged view of the A portion surrounded by the circle in FIG. 29.
Figure 31:
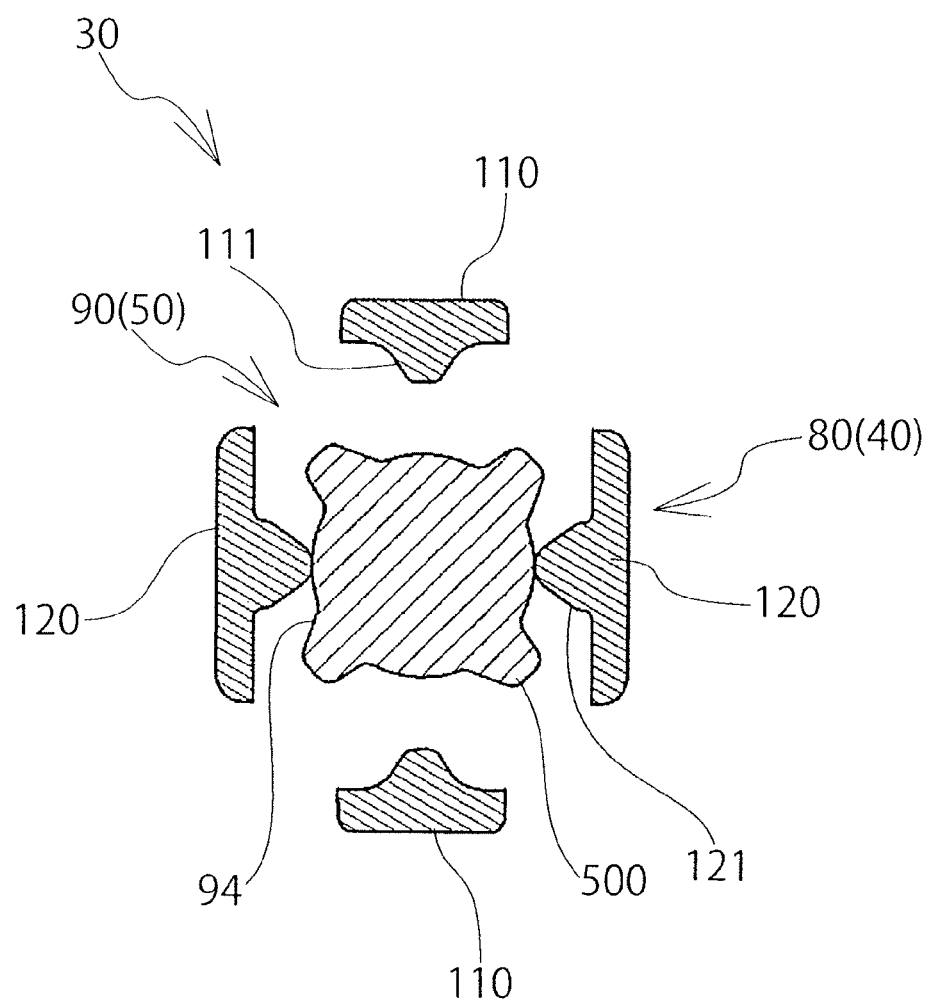
FIG. 31 is a cross-sectional view along the line X-X in FIG. 28.
Figure 32:
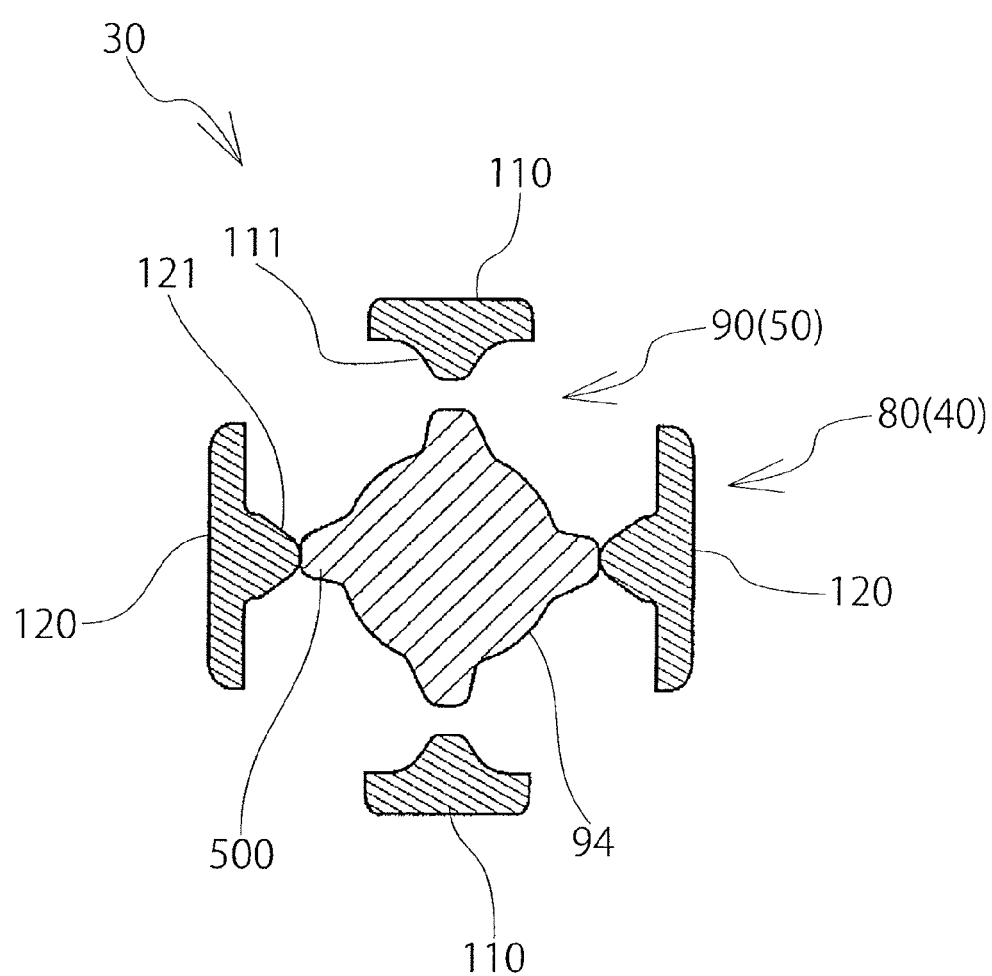
FIG. 32 is a cross-sectional view along the line Y-Y in FIG. 29.

A plurality of lock-releasing parts 500 is provided radially, for example a total of four at 90-degree intervals, in the circumferential direction of the shaft part 90 of the pin 50, as illustrated in FIGS. 31 and 32. Also, the lock-releasing parts 500 are positioned between the wide-diameter part 91 and the narrow-diameter part 92 of the shaft part 90, and extend in the axial direction of the shaft part 90, as illustrated in FIGS. 27, 29, and 30.

An inclined surface 501, contracting in diameter toward the direction of the narrow-diameter part 92, that is, being inclined downward, is formed on the outer side face of the lock-releasing part 500, as illustrated in FIG. 30.

Four lock-releasing parts 500 are provided, but [the present invention] is not limited to this, and one, two, three, or five or more may be provided.

Also, in the description of the present embodiment, the same symbols are used for the same portions of the configuration as in the first embodiment, and the descriptions are omitted.

(Method of Installation of the Clip 30)

The method of installation of the clip 30 including the grommet 40 and the pin 50 having the above configuration is first described.

When the shaft part 90 of the pin 50 is inserted into the through-hole 71 of the grommet 40, the claw-form second raised parts 121 of the second elastic leg pieces 120 are fitted into the recessed parts 84 of the shaft part 90 and are thereby locked, as illustrated in FIGS. 29 and 31, and movement in the direction of insertion of the shaft part 90 of the pin 50 is prevented.

At this time, the lower face of the elastic body 101 of the pin 50 is pushed by the wall part 72 projecting from the upper face of the collar-form part 70 of the grommet 40 and becomes in a bent-back state, as illustrated in FIG. 29.

Also, in the present embodiment, although not illustrated, the first elastic leg pieces 110 of the grommet 40 are spread open whereby the grommet 40 is fastened to the base 20, as illustrated in FIG. 4 previously described in the first embodiment.

(Method of Removal of the Clip 30)

The method of removal of the installed clip 30 is next described.

When the flange 100 of the pin 50 is rotated 45 degrees, the claw-form second raised parts 121 having been fitted into the recessed parts 94 of the shaft part 90 move from the recessed parts 94 to the lock-releasing parts 500, and ride up on the lock-releasing parts 500, as illustrated in FIGS. 29, 30, and 32.

At this time, as illustrated in FIG. 29, a first force F1 lifting up the pin 50 arises due to a repulsion Fx of the elastic body 101 in the bent-back state, and the locked state is released.

Therefore, movement in the axial direction of the shaft part 90 of the pin 50 becomes possible, and the shaft part 90 moves in the direction of coming out from the hollow inner part of the leg part 80, that is, upward. At this time, the claw-form second raised parts 121 move toward the narrow-diameter part 92 of the shaft part 90, and can no longer return to the recessed parts 94.

At the same time, the claw-form second raised parts 121 contact with the inclined surfaces 501 of the lock-releasing parts 500 when riding up on the lock-releasing parts 500, as illustrated in FIG. 30.

At this time, as illustrated in FIG. 30, a second force F2 lifting up the pin 50 arises on the inclined surfaces 501 due to a repulsion Fy of the claws, and the locked state is released.

In the present embodiment, because the angle of inclination of the inclined surfaces 501 is set gently, the locked state cannot be released by the second force F2 alone, but the locked state is released by a combined force with the first force F1 (F1+F2). It is also possible to make the angle of inclination of the inclined surfaces 501 as a steep gradient, whereby the locked state can be released by the second force F2 alone.

The entire contents of the specification, claims, drawings, and abstract of Japanese Patent Application No. 2010-102506 filed on Apr. 27, 2010 are incorporated by reference herein as a disclosure of the specification of the present invention.

What is claimed is:

1. A member fastening structure, comprising:
an installation member including a collar-form part having a through-hole in a thickness direction, and elastic leg pieces shaped in a cylindrical form on one side of said collar-form part to form a cylindrical part connecting to said through-hole of the collar-form part and having raised parts formed on inner faces thereof; and
a leg member including a flange, and a wide-diameter part and a narrow-diameter part integrally projecting from said flange and continuing at least toward a leading-end side, and a cam part rising in a circumferential direction of the wide-diameter part from the narrow-diameter part of said leg member,
wherein the raised parts of the elastic leg pieces ride up on the cam part by insertion of said leg member into said installation member in which said elastic leg pieces are expanded;
a projecting part having at least one inclined surface, and a projecting wall for contacting with the inclined surface of said projecting part and guiding in a removing direction of said leg member from said installation member when said leg member is rotated in a state in which said elastic leg pieces are spread open, are provided between said installation member and said leg member; and
said projecting part is formed between said wide-diameter part and said narrow-diameter part of said leg member, and said projecting wall is formed on said elastic leg piece of said installation member.

2. A member fastening structure, comprising:
an installation member including a collar-form part having a through-hole in a thickness direction and a projecting wall formed in a symmetrical form with respect to a circumferential direction around said through-hole, and elastic leg pieces shaped in a cylindrical form on one side of said collar-form part to form a cylindrical part connecting to said through-hole of the collar-form part and having raised parts formed at inner faces thereof; and
a leg member including a flange having a projecting part with inclined surfaces projecting from a lower face of the flange to position on an collar-form part when the leg member is inserted into the through-hole, and a shaft part having a wide-diameter part and a narrow-diameter part integrally projecting from said flange and continuing at least toward a leading-end side, and a cam part rising in a circumferential direction of the wide-diameter part from the narrow-diameter part of said leg member,
wherein the raised parts of the elastic leg pieces ride up on the cam part to expand the elastic leg pieces when said leg member is inserted into said installation member;
when the leg member is rotated in either direction in a state wherein the shaft part is inserted into the through-hole, the projecting part contacts the projecting wall contact; and
when the leg member is further rotated, the leg member is guided by the flange in a direction of floating up from the upper face of the collar-form part through contacting of the projecting part with the inclined surfaces of the projecting wall to remove the leg member from the installation member.

3. A member fastening structure according to claim 2, wherein the installation member includes a plurality of projecting walls radially arranged around the through-hole, each of the plurality of projecting walls being formed in the symmetrical form with respect to the circumferential direction around the through-hole;
the leg member includes a plurality of projecting parts radially arranged on lower face of the flange, each of the plurality of projecting parts having the inclined surfaces and being formed in the symmetrical form with respect to a circumferential direction of the flange; and
each of the plurality of walls contacts one of the inclined surfaces of each of the plurality of projecting parts to guide the leg member in the direction of floating up from the upper face of the collar-form part when the flange is rotated in either direction.

4. A member fastening structure according to claim 3, wherein the shaft part includes a plurality of guide ribs extending in an axial direction of the shaft part from the leading-end side, and the plurality of guide ribs is fitted inside gaps between the elastic leg pieces, respectively, to prevent the shaft part from rotating inadvertently in the through-hole.

5. A member fastening structure according to claim 4, wherein the shaft part includes recessed parts formed in the wide-diameter part;
the leg pieces include a pair of first leg pieces facing each other and a pair of second leg pieces facing each other, and the raised parts include a pair of first raised parts formed on inner faces of the pair of first leg pieces and a pair of second raised parts formed on inner faces of the pair of second leg pieces; and
the pair of first raised parts contacts the wide diameter part to expand the pair of first leg parts in the diameter direction, and the pair of second raised parts is fitted into the recessed parts to prevent movement in the axial direction of the shaft part, when the leg member is inserted into the installation member.

6. A member fastening structure according to claim 5, wherein each of the plurality of projecting parts has two inclined surfaces to form an arrow portion at a front edge thereof, and the front edge of the arrow portion extends toward a center portion of the through-hole.

7. A clip adapted to fasten a member, comprising:
a grommet having a collar-form part, a leg part hanging down from said collar-form part, and a through-hole running through from the collar-form part to the leg part; and
a pin having a shaft part for expanding said leg part in a diameter direction by being inserted into said through-hole, and a flange part extending from said shaft part and having a larger diameter than that of said through-hole;
wherein a recessed part is formed on the shaft part and a raised part is formed on the leg part, and when the recessed part and the raised part fit together elastically in a state in which said leg part expands in the diameter direction, movement of the shaft part in an axial direction is prevented in said through-hole;
a lock-releasing part is formed in a circumferential direction of the recessed part and is raised in a radial direction of said recessed part to move the shaft part in the axial direction of said shaft part in said through-hole when said flange is rotated in a state in which the recessed part and the raised part are fitted together;
an elastic body having elasticity is provided on a perimeter edge of said flange;
said collar-form part is provided with a wall part to elastically contact with said elastic body in a state in which said leg part expands in the diameter direction, and the elastic body is deformed elastically to accumulate an elastic return force; and
when said flange is rotated in the state in which said leg part expands in the diameter direction, by the elastic return force accumulated in said elastic body, said shaft part is urged in a direction to be released from said through-hole.

* * * * *